United States Patent
Yata et al.

(10) Patent No.: US 11,391,981 B2
(45) Date of Patent: Jul. 19, 2022

(54) DISPLAY DEVICE WITH IMPROVED LUMINANCE AND SATURATION

(71) Applicant: Japan Display Inc., Tokyo (JP)

(72) Inventors: Tatsuya Yata, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/985,284

(22) Filed: Aug. 5, 2020

(65) Prior Publication Data

US 2020/0363678 A1    Nov. 19, 2020

Related U.S. Application Data

(63) Continuation of application No. 15/959,446, filed on Apr. 23, 2018, now Pat. No. 10,768,469.

(30) Foreign Application Priority Data

Apr. 28, 2017  (JP) .............................. JP2017-090318
Feb. 21, 2018  (JP) .............................. JP2018-028944

(51) Int. Cl.
*G02F 1/1335*    (2006.01)
*G02F 1/1343*    (2006.01)

(52) U.S. Cl.
CPC ...... *G02F 1/133514* (2013.01); *G02F 1/1343* (2013.01); *G02F 1/133512* (2013.01);
(Continued)

(58) Field of Classification Search
CPC combination set(s) only.
See application file for complete search history.

(56) References Cited

U.S. PATENT DOCUMENTS

| | | |
|---|---|---|
| 2007/0085862 A1 | 4/2007 | Moriya et al. |
| 2008/0084376 A1 | 4/2008 | Hirota et al. |
| 2009/0115952 A1 | 5/2009 | Nakamura et al. |
| 2012/0206326 A1 | 8/2012 | Nakamura et al. |
| 2012/0229529 A1 | 9/2012 | Tomizawa et al. |
| 2014/0285761 A1 | 9/2014 | Tamaki et al. |

(Continued)

FOREIGN PATENT DOCUMENTS

| | | |
|---|---|---|
| CN | 102597859 A | 7/2012 |
| CN | 104077966 A | 10/2014 |

(Continued)

OTHER PUBLICATIONS

Chinese Office Action dated Oct. 19, 2020 for the corresponding Chinese Patent Application No. 201810389162.7, with English machine translation.
(Continued)

*Primary Examiner* — Lauren Nguyen
(74) *Attorney, Agent, or Firm* — Michael Best & Friedrich LLP

(57) ABSTRACT

According to an aspect, a display device includes a pixel including: a first sub-pixel including a first color filter transmitting light having a spectrum peak falling on a spectrum of reddish green; a second sub-pixel including a second color filter transmitting light having a spectrum peak failing on a spectrum of bluish green; a third sub-pixel including a third color filter transmitting light having a spectrum peak falling on a spectrum of red; and a fourth sub-pixel including a fourth color filter transmitting light having a spectrum peak falling on a spectrum of blue. The first, second, third, and fourth sub-pixels each include a reflective electrode reflecting light transmitted through the color filter. Each of the third and fourth sub-pixels is greater in size than the first and second sub-pixels. The first sub-pixel with the second sub-pixel has a size equal to or greater than that of the third sub-pixel.

15 Claims, 12 Drawing Sheets

(52) U.S. Cl.
 CPC .. *G02F 1/133528* (2013.01); *G02F 1/133553* (2013.01); *G02F 1/134309* (2013.01); *G02F 1/134345* (2021.01); *G09G 2300/0452* (2013.01)

(56) References Cited

U.S. PATENT DOCUMENTS

2015/0212367 A1* 7/2015 Wang ............... G02B 5/201
 349/108
2016/0062179 A1* 3/2016 Eguchi ............ G02F 1/13306
 349/25

FOREIGN PATENT DOCUMENTS

| | | |
|---|---|---|
| JP | H11-258587 A | 9/1999 |
| JP | 2007-109616 A | 4/2007 |
| JP | 2007-133346 A | 5/2007 |
| JP | 2007-140456 A | 6/2007 |
| JP | 2008-096549 A | 4/2008 |
| JP | 2014-186283 A | 10/2014 |
| WO | 2007/148519 A1 | 12/2007 |
| WO | 2011/065332 A1 | 6/2011 |

OTHER PUBLICATIONS

Japanese Office Action dated Nov. 24, 2021 for the corresponding Japanese Application No. 2018-028944, with English machine translation.

Japanese Office Action dated May 24, 2022, for the corresponding Japanese Patent Application No. 2018-028944, with English machine translation.

* cited by examiner

FIG.4

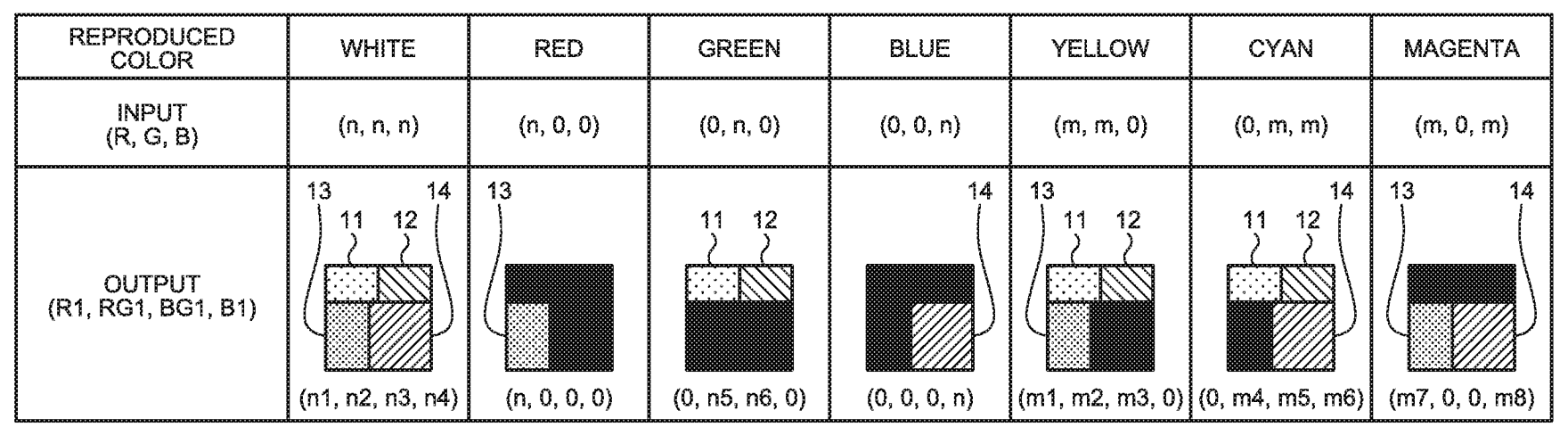

| REPRODUCED COLOR | WHITE | RED | GREEN | BLUE | YELLOW | CYAN | MAGENTA |
|---|---|---|---|---|---|---|---|
| INPUT (R, G, B) | (n, n, n) | (n, 0, 0) | (0, n, 0) | (0, 0, n) | (m, m, 0) | (0, m, m) | (m, 0, m) |
| | | | | | | | |
| OUTPUT (R1, RG1, BG1, B1) | (n1, n2, n3, n4) | (n, 0, 0, 0) | (0, n5, n6, 0) | (0, 0, 0, n) | (m1, m2, m3, 0) | (0, m4, m5, m6) | (m7, 0, 0, m8) |

US 11,391,981 B2

DISPLAY DEVICE WITH IMPROVED LUMINANCE AND SATURATION

CROSS-REFERENCE TO RELATED APPLICATIONS

This application is a continuation of U.S. patent application Ser. No. 15/959,446 filed on Apr. 23, 2018. Further, this application claims priority from Japanese Application No. 2017-090318, filed on Apr. 28, 2017 and Japanese Application No. 2018-028944, filed on Feb. 21, 2018, the contents of which are incorporated by reference herein in its entirety.

BACKGROUND

1. Technical Field

The present disclosure relates to a display device.

2. Description of the Related Art

As disclosed in Japanese Patent Application Laid-open Publication No. 2010-97176, a reflective display device that reflects external light to display a color image has been known.

The reflective display device typically combines light reflected from sub-pixels of red (R), green (G), and blue (B) to output light having a color other than the foregoing colors. However, yellow obtained by combining reflected light in red (R) and green (G) looks dingy, and obtaining required luminance and saturation has been a difficult task to achieve.

For the foregoing reasons, there is a need for a display device that can enhance the luminance and saturation of yellow.

SUMMARY

According to an aspect, a display device includes: a pixel including: a first sub-pixel including a color filter that transmits light having a spectrum peak falling on a spectrum of reddish green; a second sub-pixel including a second color filter that transmits light having a spectrum peak falling on a spectrum of bluish green; a third sub-pixel including a third color filter that transmits light having a spectrum peak falling on a spectrum of red; and a fourth sub-pixel including a fourth color filter that transmits light having a spectrum peak falling on a spectrum of blue. The first sub-pixel, the second sub-pixel, the third sub-pixel, and the fourth sub-pixel each include a reflective electrode that reflects light transmitted through the corresponding color filter. Each of the third sub-pixel and the fourth sub-pixel is greater in size than the first sub-pixel and the second sib-pixel. The first sub-pixel added to the second sub-pixel has a size equal to or greater than a size of the third sub-pixel.

According to another aspect, a display device includes: a pixel including: a first sub-pixel including a first color filter that transmits light having a spectrum peak falling on a spectrum of reddish green; a second, sub-pixel including a second color filter that transmits light having a spectrum peak falling on a spectrum of bluish green; a third sub-pixel including a third color filter that transmits light having a spectrum peak falling on a spectrum of red; and a fourth sub-pixel including a fourth color filter that transmits light having a spectrum peak falling on a spectrum of blue. The first sub-pixel, the second sub-pixel, the third sub-pixel, and the fourth sub-pixel each include a reflective electrode that reflects light transmitted through the corresponding color filter. Each of the third sub-pixel and the fourth sub-pixel is greater in size than the first sub-pixel and the second sub-pixel. The first sub-pixel added to the second sub-pixel has a size equal to or greater than a size of the third sub-pixel and has a size equal to or greater than a size of the fourth sub-pixel.

According to another aspect, a display device includes: a pixel including: a first sub-pixel including a first color filter that transmits light having a spectrum peak falling on a spectrum of reddish green; a second sub-pixel including a second color filter that transmits light having a spectrum peak falling on a spectrum of bluish green; a third sub-pixel including a third color filter that transmits light having a spectrum peak falling on a spectrum of red; and a fourth sub-pixel including a fourth color filter that transmits light having a spectrum peak falling on a spectrum of blue. The first sub-pixel, the second sub-pixel, the third sub-pixel, and the fourth sub-pixel each include a reflective electrode that reflects light transmitted through the corresponding color filter. When the pixel displays yellow having maximum luminance, the first sub-pixel, the second sub-pixel, and the third sub-pixel each exhibit maximum luminance. A total area of the first sub-pixel, the second sub-pixel, and the third sub-pixel is greater than twice an area of the fourth sub-pixel.

BRIEF DESCRIPTION OF THE DRAWINGS

FIG. 4 is a chart indicating relations among reproduced colors by a single pixel, R, G, and B gradation values applied as image signals, and the sub-pixels used for the output;

DETAILED DESCRIPTION

Figure 1:
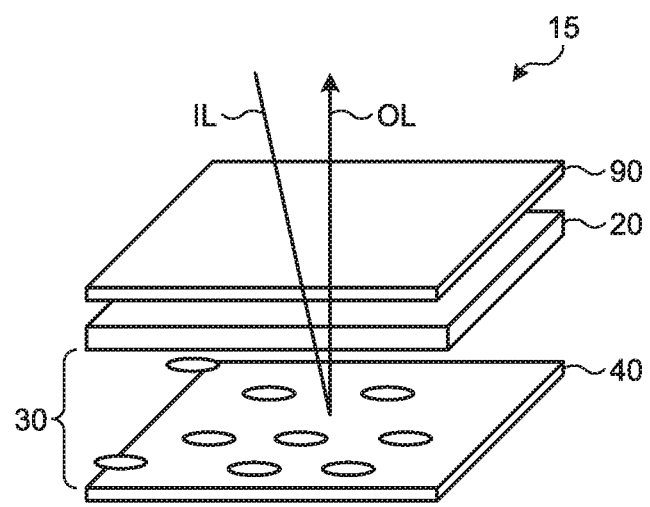
FIG. 1 is a perspective view schematically illustrating a main configuration of a single sub-pixel.

Modes (embodiments) for carrying out the present disclosure will be described below in detail with reference to the drawings. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being, "on" another element B, the element A can be directly on the other element B, or there can be one or more elements between the element A and the other element B.

Figure 2:
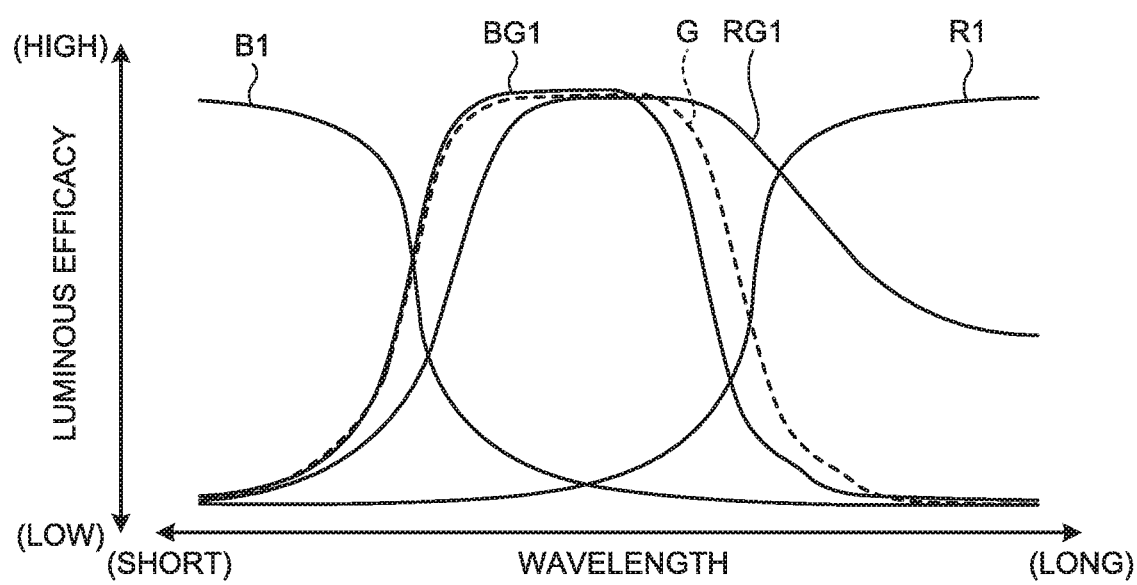
FIG. 2 is a graph indicating exemplary spectra of red, reddish green, green, bluish green, and, blue.

FIG. 1 is a perspective view schematically illustrating a main configuration of a single sub-pixel 15. FIG. 2 is a graph indicating exemplary spectra of red, reddish green, green, bluish green, and blue. The sub-pixel 15 includes a color filter 20 and a reflective electrode 40. The color filter 20 has light transmissivity. The color filter 20 has a predetermined peak of a spectrum of light OL to be transmitted out of external light IL. Specifically, the peak of the spectrum of the light OL to be transmitted through the color filter 20 falls on either one of the spectrum of reddish green (e.g., first red green RG1), the spectrum of bluish green (e.g., first blue green BG1), the spectrum of red (e.g., red R1), and the spectrum of blue (e.g., blue B1). The reflective electrode 40 reflects the light OL that is transmitted through the color filter 20. As exemplified in FIG. 2, the peak of the spectrum of the first red green RG1 and the peak of the spectrum of the first blue green BG1 each have a portion overlapping with the peak of the spectrum of light viewed as green G. The spectrum of the first red green RG1 is closer to the spectrum of the red R1 (on the long wavelength side) than the spectrum of the first blue green BG1 and the spectrum of the green G are. The spectrum of the first blue green BG1 is closer to the spectrum of the blue B1 (on the short wavelength side) than the spectrum of the first red green RG1 and the spectrum of the green G are.

A liquid crystal layer 30 is disposed between the color filter 20 and the reflective electrode 40. The liquid crystal layer 30 includes liquid crystal having an orientation determined according to a voltage applied thereto by the reflective electrode 40, for example. The liquid crystal layer 30 varies a degree of transmission of the light OL that passes between the color filter 20 and the reflective electrode 40 according to the orientation. A light modulation layer 90 may be disposed on the opposite side of the liquid crystal layer 30 across the color filter 20. The light modulation layer 90 modulates, for example, a scattering direction of the light OL emitted from the display device.

Figure 3:
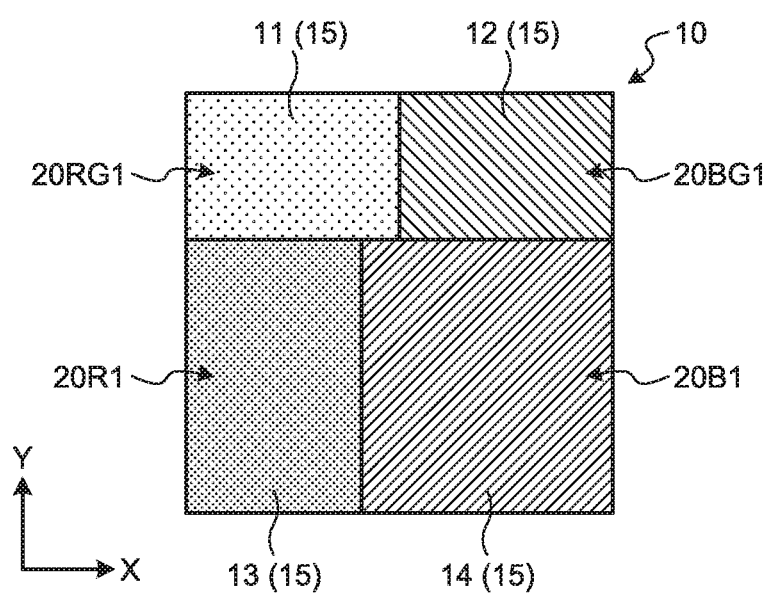
FIG. 3 is a diagram illustrating exemplary shapes and sizes of sub-pixels included in a single pixel, an exemplary positional relation among the sub-pixels, and exemplary color filters of the respective sub-pixels.

FIG. 3 is a diagram illustrating exemplary shapes and sizes of the sub-pixels 15 included in a single pixel 10, an exemplary positional relation among the sub-pixels 15, and exemplary color filters 20 of the respective sub-pixels 15.

The pixel 10 includes a first sub-pixel 11, a second sub-pixel 12, a third sub-pixel 13, and a fourth sub-pixel 14. The first sub-pixel 11 includes a first color filter 20RG1. The second sub-pixel 12 includes a second color filter 20BG1. The third sub-pixel 13 includes a third color filter 20R1. The fourth sub-pixel 14 includes a fourth color filter 20B1. The peak of the spectrum of the light transmitted through the first color filter 20RG1 falls on the spectrum of the reddish green (first red green RG1). The peak of the spectrum of the light transmitted through the second color filter 20BG1 falls on the spectrum of the bluish green (first blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). The pixel has a square shape in a plan view, and includes the sub-pixels in the respective four colors in respective regions obtained by sectioning the square pixel region. The sub-pixels each have a square or rectangular shape in a plan view (hereinafter referred to as a rectangle). The four rectangles are combined to form the square pixel. A light shielding layer such as a black matrix may be disposed in regions between the sub-pixels and an outer edge of the pixel, but this light shielding layer occupies only a small area of the pixel. Thus, when describing the shapes or combination of the sub-pixels or the shape of the pixel, such a light shielding layer may be substantially disregarded as a linear object constituting an outer edge of the pixel or the sub-pixel.

In the following description, the term "color filter 20" will be used to describe the color filter 20 when the peak of the spectrum of the light OL to be transmitted is not differentiated. When the peak of the spectrum of the light OL to be transmitted is differentiated, the color filter 20 will be described as, for example, the first color filter 20RG1, the second color filter 20BG1, the third color filter 20R1, or the fourth color filter 20B1, where appropriate. The light OL that has been transmitted through the color filter 20 is viewed as light in the color corresponding to the peak of the spectrum of the light to be transmitted through the color filter 20. The term "sub-pixel 15" will be used when the sub-pixel 15 is not differentiated among the first sub-pixel 11, the second sub-pixel 12, the third sub-pixel 13, and the fourth sub-pixel 14, for example, by the colors of the color filters 20 included in the respective sub-pixels 15. The first sub-pixel 11, the second sub-pixel 12, the third sub-pixel 13, and the fourth sub-pixel 14 each include the reflective electrode 40 as illustrated in FIG. 1, which is omitted in FIG. 3.

The third sub-pixel 13 and the fourth sub-pixel 14 are each greater in size than the first sub-pixel 11 and the second sub-pixel 12. The first sub-pixel 11 added to the second sub-pixel 12 has a size equal to or greater than a size of the third sub-pixel 13. The fourth sub-pixel 14 is greater in size than the third sub-pixel 13. The first sub-pixel 11 is identical in size to the second sub-pixel 12. When an area ratio of the first sub-pixel 11, the second sub-pixel 12, the third sub-pixel 13, and the fourth sub-pixel 14 is expressed as A to B to C to D, the following expressions hold: $0.65 \leq A=B<1.0$, $1.0 \leq C<D$, $D=4-(A+B+C)$, and $D \leq 1.7$. FIG. 3 exemplifies a case in which the expression of A to B to C to D=0.744 to 0.744 to 1.130 to 1.382 holds. In this case, the first sub-pixel 11 added to the second sub-pixel 12 has a size equal to or greater than a size of the third sub-pixel 13 and has a size equal to or greater than a size of the fourth sub-pixel 14. In the embodiment, the first sub-pixel shares part of a side with the fourth sub-pixel. In contrast, the second sub-pixel and the third sub-pixel share no side. More specifically, a side shared between the first sub-pixel and the second sub-pixel coincides with an intermediate line dividing the pixel laterally into half. In contrast, a side shared between the third sub-pixel and the fourth sub-pixel is shifted toward the first sub-pixel with respect to the intermediate line. As a result, the first sub-pixel and the fourth sub-pixel share part of the side.

FIG. 4 is a chart indicating relations among reproduced colors by a single pixel, R, G, and B gradation values applied as image signals, and the sub-pixels used for the output. When the input gradation values of R, G, and B are expressed as (R, G, B)=(n, n, n), the reproduced color is white and the first sub-pixel 11, the second sub-pixel 12, the third sub-pixel 13, and the fourth sub-pixel 14 are used for the output. When the input gradation values of R, G, and B are expressed as (R, G, B)=(n, 0, 0), the reproduced color is red and the third sub-pixel 13 is used for the output. When the input gradation values of R, G, and B are expressed as (R, G, B)=(0, n, 0), the reproduced color is green and the first sub-pixel 11 and the second sub-pixel 12 are used for the output. When the input gradation values of R, G, and B are expressed as (R, G, B)=(0, 0, n), the reproduced color is blue and the fourth sub-pixel 14 is used for the output. When the input gradation values of R, G, and B are expressed as (R, G, B)=(m, m, 0), the reproduced color is yellow and the first sub-pixel 11, the second sub-pixel 12, and the third sub-pixel 13 are used for the output. When the input gradation values of R, G, and B are expressed as (R, G, B)=(0, m, m), the reproduced color is cyan and the first sub-pixel 11, the second sub-pixel 12, and the fourth sub-pixel 14 are used for the output. When the input gradation values of R, G, and B are expressed as (R, G, B)=(m, 0, m), the reproduced color is magenta and the third sub-pixel 13 and the fourth sub-pixel 14 are used for the output. In this manner, the display device in the embodiment reproduces yellow through the combination of the first sub-pixel 11, the second sub-pixel 12, and the third sub-pixel 13. The display device in the embodiment reproduces green through the combination of the first sub-pixel 11 and the second sub-pixel 12. The display device in the embodiment reproduces cyan through the combination of the first sub-pixel 11, the second sub-pixel 12, and the fourth sub-pixel 14. The display device in the embodiment reproduces magenta through the combination of the third sub-pixel 13 and the fourth sub-pixel 14. The display device in the embodiment reproduces red using the third sub-pixel 13. The display device in the embodiment reproduces blue using the fourth sub-pixel 14.

Figure 5:
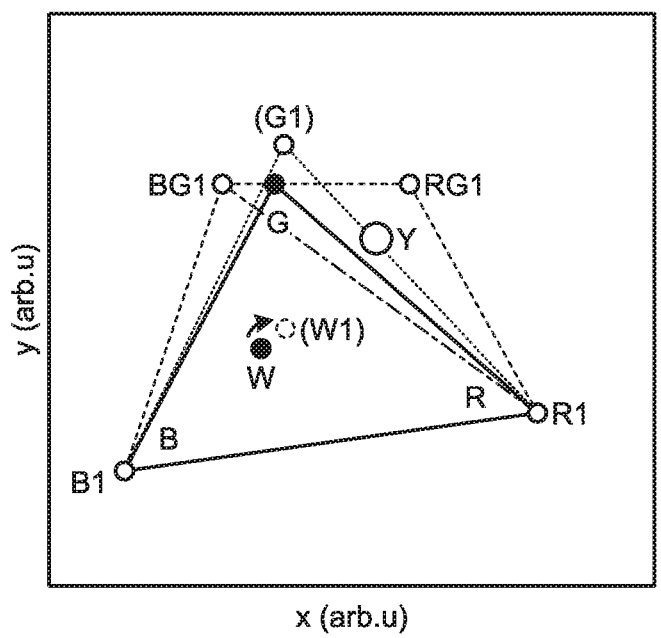
FIG. 5 is a chart indicating a schematic chromaticity diagram (xy chromaticity diagram) that represents a correspondence between yellow reproduced by a display device in an embodiment and the peaks of spectra of light transmitted through the color filter, the chromaticity diagram being plotted within chromaticity coordinates (xy chromaticity coordinates)

FIG. 5 is a chart indicating a schematic chromaticity diagram (xy chromaticity diagram) that represents a correspondence between yellow reproduced by the display device in the embodiment and the peaks of the spectra of the light OL transmitted through the color filter 20, the chromaticity diagram being plotted within chromaticity coordinates (xy chromaticity coordinates). In FIG. 5, the solid-line triangle having three vertexes of R, G, and B represents a color space that indicates colors that can be reproduced by sub-pixels of respective three colors of the conventional red (R), conventional green (G), and conventional blue (B) included in the conventional display device, with respect to the reproduction of yellow Y having predetermined luminance and saturation required for a display device. Such a conventional display device is unable to reproduce the yellow Y. Specifically, the luminance and saturation of yellow to be reproduced by the conventional display device are unable to exceed luminance and saturation on a straight line connecting the conventional red (R) and the conventional green (G) with respect to a white point (W), and at least either one of the luminance and saturation fails to reach the value to reproduce the yellow Y. Even when the conventional display device includes sub-pixels of four colors of white (W) added to the conventional red (R), the conventional green (G), and the conventional blue (B), increasing saturation of the yellow Y using the sub-pixel of white (W) is a difficult task to achieve.

Trying to reproduce the yellow Y using the sub-pixels of three colors by a conventional technology requires the conventional red (R) and the conventional green (G) to be shifted to red (e.g., R1) and green (e.g., G1) that can reproduce the yellow Y. However, shifting the conventional red (R) and the conventional green (G) to the red (e.g., R1) and the green (e.g., G1) that can reproduce the yellow Y by simply targeting the reproduction of the yellow Y causes the white point (W) to be shifted toward the yellow Y. Specifically, setting the red (e.g., R1) and the green (e.g., G1) by targeting the reproduction of the yellow Y in the conventional display device causes a color reproduced by lighting all sub-pixels to be tinged with yellow as a whole, resulting in changing color reproducibility. FIG. 5 schematically indicates the white point (W) before being shifted toward the yellow Y using a black dot. FIG. 5 further indicates the white point after having been shifted toward the yellow Y using a blank dot outlined by the broken line and denoted as W1. Setting the red (e.g., R1) and the green (e.g., G1) by targeting the reproduction of the yellow Y means to further darken these colors, and reduce light transmission efficiency of the color filter 20 and luminance, resulting in dark yellow.

Trying to achieve the luminance and the saturation corresponding to the yellow Y by adding the yellow sub-pixel to the pixel of the conventional display device still causes the color reproduced by lighting all sub-pixels to be tinged with yellow as a whole, resulting in changing color reproducibility.

In the display device according to the embodiment, on the other hand, the first sub-pixel 11 includes the first color filter 20RG1, and the second sub-pixel 12 includes the second color filter 20BG1. The peak of the spectrum of the light transmitted through the first color filter 20RG1 falls on the spectrum of the reddish green (first red green RG1). The peak of the spectrum of the light transmitted through the second color filter 20BG1 falls on the spectrum of the bluish green (first blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). More specifically, by representing the peak of the spectrum of the light that passes through the first color filter on the chromaticity coordinates (RG1 in FIG. 5), the x-coordinate of the peak is between the x-coordinate of the white point and the x-coordinate of the red (R1 in FIG. 5) corresponding to the third color filter 20R1. Similarly, by representing the peak of the spectrum of the light that passes through the second color filter on the chromaticity coordinates (BG1 in FIG. 5), the x-coordinate of the peak is between the x-coordinate of the white point and the x-coordinate of the blue (B1 in FIG. 5) corresponding to the fourth color filter 20B1. Thus, the embodiment obtains a blue component through the second sub-pixel 12 and the fourth sub-pixel 14, thereby preventing the white point (W) from being shifted toward the yellow Y. The embodiment reproduces yellow through the combination of the first sub-pixel 11, the second sub-pixel 12, and the third sub-pixel 13. Specifically, the peaks of the spectra of light transmitted through the first color filter 20RG1, the second color filter 20BG1, and the third color filter 20R1, respectively, are set such that a combined color of the first red green RG1, the first blue green BG1, and the red R1 is the yellow Y. This configuration allows the yellow Y to be reproduced using the three sub-pixels 15 out of the four sub-pixels 15 of the single pixel 10. Thus, the embodiment allows the area of the sub-pixels 15 used for reproducing the yellow Y to be easily increased as compared with a case in which two colors (R and G) are used out of the sub-pixels of three colors of the conventional red (R), the conventional green (G), and the conventional blue (B). Specifically, the embodiment allows larger part of the color filter 20 and the reflective electrode 40 combining the first sub-pixel 11, the second sub-pixel 12, and the third sub-pixel 13 out of a display area of the single pixel 10 to be easily allocated to the reproduction of the yellow Y, thereby reliably achieving the luminance and the saturation of the yellow Y. Further, the embodiment also enhances the luminance and the saturation of cyan. Additionally, as compared with a configuration including a sub-pixel of white (W), the embodiment allows the third sub-pixel 13 including the third color filter 20R1 corresponding to the red (R1) to be easily enlarged, thereby enhancing the reproducibility of primary colors.

The embodiment allows the light transmission efficiency of the first color filter 20RG1 transmitting the light whose spectrum peak corresponds to the reddish green (e.g., first red green RG1) to be easily increased. Thus, the embodiment uses the first sub-pixel 11 including the first color filter 20RG1 for the reproduction of the yellow Y, thereby reliably achieving the luminance and the saturation of the yellow Y.

In the display device including the reflective electrode 40 like the display device in the embodiment, a reflection factor and contrast of the light OL reflected by the reflective electrode 40 remain constant. Meanwhile, the visual quality of colors of an image output by the display device depends on the light source color and luminous intensity of the external light IL. Thus, when the external light IL is obtained under a bright environment, for example, the visual quality of colors of the image tends to be good. In contrast, when the external light IL is obtained under a dark environment, it is relatively difficult to exhibit reliable visibility. The color filter 20 does not completely transmit the external light IL regardless of the peak of the spectrum of the light OL to be transmitted, and absorbs at least part of the external light IL. Trying to darken the reproduced color using the color filter 20 increases a ratio of an absorbed part of the external light IL. Thus, the display device that outputs an image through reflection of the light OL by the reflective electrode 40 is required to balance the saturation and the luminance by setting the peaks of the spectra of the light OL transmitted through the color filters 20 and adjusting an area ratio of the color filters 20 having different peaks. In other words, the display device that outputs the image through reflection of the light OL by the reflective electrode 40 has an extreme difficulty in adjusting colors and luminance by adjusting the light source, which can be achieved by a display device having other configurations permitting selection and adjustments of the light source. Application of the present embodiment to even such a display device that outputs the image through reflection of the light OL by the reflective electrode 40 can still reliably obtain the luminance and saturation of the yellow Y.

In the embodiment, the area ratio of the first color filter 20RG1, the second color filter 20BG1, the third color filter 20R1, and the fourth color filter 20B1, and the spectra of the first red green RG1, the first blue green BG1, the red R1, and the blue B1 are determined depending on the required white point W and the required luminance and the saturation of the yellow Y. The blue B1 in the embodiment and the conventional blue (B), which are identical to each other in FIG. 5, may be different from each other. The red R1 in the embodiment and the conventional red (R), which are identical to each other in FIG. 5, may be different from each other. Although the combination of the first red green RG1 and the first blue green BG1 reproduces the conventional green (G) in FIG. 5, the combination of the first red green RG1 and the first blue green BG1 may reproduce green that is different from the conventional green (G).

Figure 6:
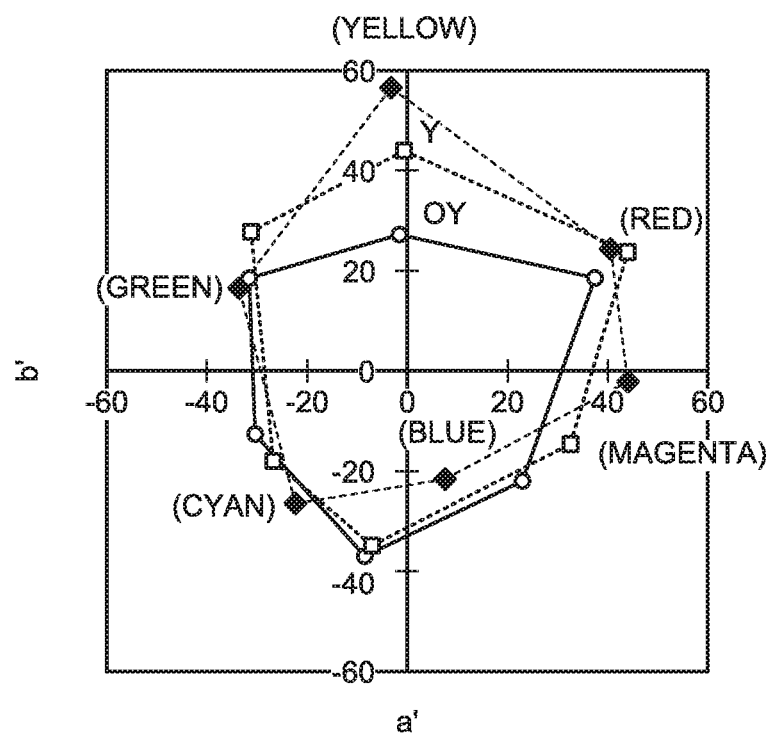
FIG. 6 is a chart indicating exemplary color reproducibility of the embodiment and that of a comparative example in an L*a*b* color space.

FIG. 6 is a chart indicating exemplary color reproducibility of the embodiment and that of a comparative example in an L*a*b* color space. In FIG. 6, SNAP indicates yellow, green, cyan, blue, magenta, and red specified by the Specifications for Newsprint Advertising Production. A display device in the comparative example is an RGBW reflective display device that includes sub-pixels of four colors, i.e., white (W) in addition to the conventional red (R), the conventional green (G), and the conventional blue (B). The display device in the embodiment described with reference to FIGS. 1 to 5 can reproduce the yellow Y that is brighter and more vivid than yellow OY to be reproduced by the display device in the comparative example. The display device in the embodiment can satisfy the demand in advertisement or the like by reproducing the bright and vivid yellow Y as required.

Figure 7:
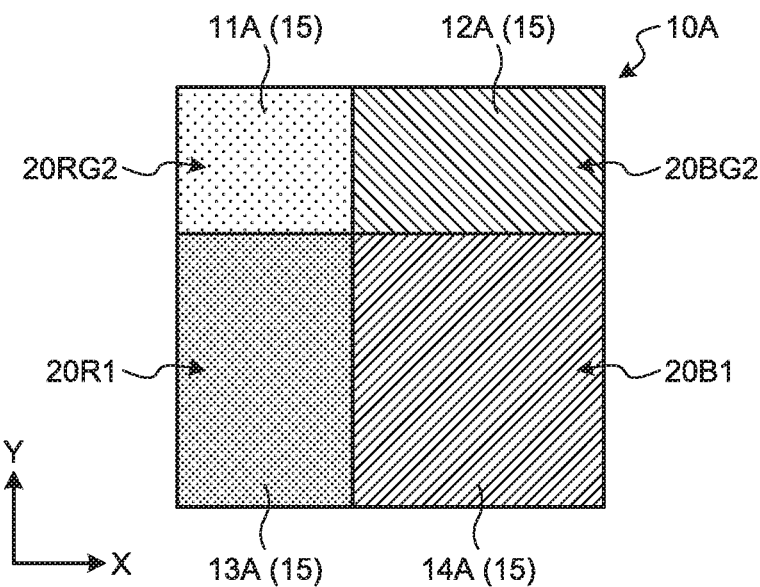
FIG. 7 is a diagram illustrating exemplary shapes and sizes of sub-pixels included in a single pixel, an exemplary positional relation among the sub-pixels, and exemplary color filters of the respective sub-pixels.
Figure 8:
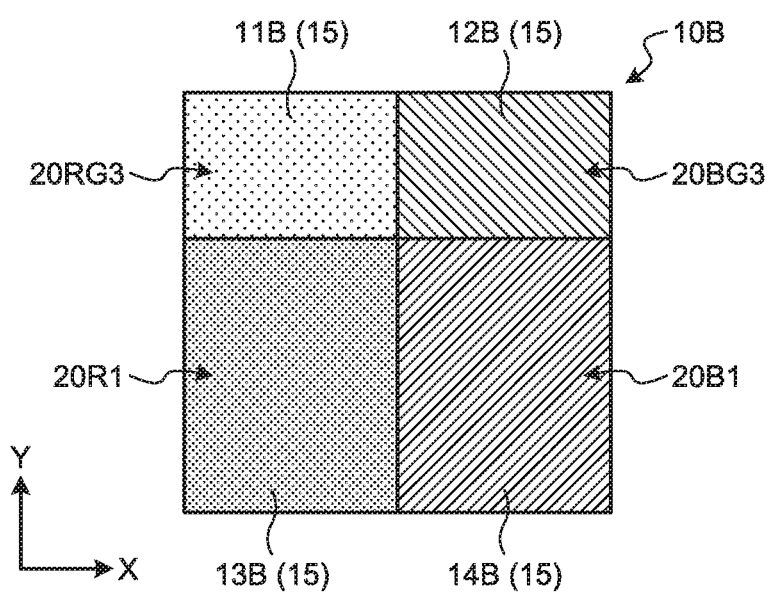
FIG. 8 is a diagram illustrating exemplary shapes and sizes of sub-pixels included in a single pixel, an exemplary positional relation among the sub-pixels, and exemplary color filters of the respective sub-pixels.

FIG. 7 is a diagram illustrating exemplary shapes and sizes of sub-pixels 15 included in a single pixel 10A, an exemplary positional relation among the sub-pixels 15, and exemplary color filters 20 of the respective sub-pixels 15. FIG. 8 is a diagram illustrating exemplary shapes and sizes of sub-pixels 15 included in a single pixel 10B, an exemplary positional relation among the sub-pixels 15, and exemplary color filters 20 of the respective sub-pixels 15. The display device in the embodiment may include, in place of the pixel 10 illustrated in FIG. 3, the pixel 10A illustrated in FIG. 7 or the pixel 10B illustrated in FIG. 8.

The pixel 10A illustrated in FIG. 7 includes a first sub-pixel 11A, a second sub-pixel 12A, a third sub-pixel 13A, and a fourth sub-pixel 14A. The first sub-pixel 11A includes a first color filter 20RG2. The second sub-pixel 12A includes a second color filter 20BG2. The peak of the spectrum of the light transmitted through the first color filter 20RG2 falls on the spectrum of the reddish green (second red green RG2). The peak of the spectrum of the light transmitted through the second color filter 20BG2 falls on the spectrum of the bluish green (second blue Green RG2). The third sub-pixel 13A includes the third color filter 20R1, similarly to the third sub-pixel 13 illustrated in FIG. 3. The fourth sub-pixel 14A includes the fourth color filter 20B1, similarly to the fourth sub-pixel 14 illustrated in FIG. 3. The third sub-pixel 13A and the fourth sub-pixel 14A are each greater in size than the first sub-pixel 11A and the second sub-pixel 12A. The first sub-pixel 11A added to the second sub-pixel 12A has a size equal to or greater than a size of the third sub-pixel 13A and has a size equal to or greater than a size of the fourth sub-pixel 14A. The fourth sub-pixel 14A is greater in size than the third sub-pixel 13A. The second sub-pixel 12A is greater in size than the first sub-pixel 11A. When an area ratio of the first sub-pixel 11A, the second sub-pixel 12A, the third sub-pixel 13A, and the fourth sub-pixel 14A is expressed as E to F to G to H, the following expressions hold: $0.65 \le E < F < 1.0$, $1.0 \le G = H$, and $H < 1.7$. Further, the expression of E to F=G to H holds in the example illustrated in FIG. 7, but E to F may be a different ratio from that of G to H. A configuration in which the expression of E to F=G to H holds makes it easy to dispose a signal line 61 and a scanning line 62 (see FIG. 12) at a position corresponding to a boundary between sub-pixels 15 having different color filters 20. FIG. 7 illustrates an exemplary case in which the ratio obtained through rounding each value to the third decimal places is expressed as E to F to G to H=0.669 to 0.819 to 1.130 to 1.382. In this case, the first sub-pixel 11 added to the second sub-pixel 12 has a size equal to or greater than a size of the third sub-pixel 13 and has a size equal to or greater than a size of the fourth sub-pixel 14. Color reproduction by the pixel 10A illustrated in FIG. 7 can be described by reading the first sub-pixel 11, the second sub-pixel 12, the third sub-pixel 13, and the fourth sub-pixel 14 described with reference to FIG. 4 as the first sub-pixel 11A, the second sub-pixel 12A, the third sub-pixel 13A, and the fourth sub-pixel 14A, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line is shifted toward the first sub-pixel (left edge side of the pixel) with respect to a centerline that laterally divides the pixel into half. The horizontal line is shifted toward the first sub-pixel (upper edge side of the pixel) with respect to a centerline that vertically divides the pixel into half. This configuration makes the magnitude relation of $E < F \le G < H$ hold.

The pixel 10B illustrated in FIG. 8 includes a first sub-pixel 11B, a second sub-pixel 12B, a third sub-pixel 13B, and a fourth sub-pixel 14B. The first sub-pixel 11B includes a first color filter 20RG3. The second sub-pixel 12B includes a second color filter 20BG3. The peak of the spectrum of the light transmitted through the first color filter 20RG3 falls on the spectrum of the reddish green (third red green RG3). The peak of the spectrum of the light transmitted through the second color filter 20BG3 falls on the spectrum of the bluish green (third blue green BG3). The third sub-pixel 13B includes the third color filter 20R1, similarly to the third sub-pixel 13 illustrated in FIG. 3. The fourth sub-pixel 14B includes the fourth color filter 20B1, similarly to the fourth sub-pixel 14 illustrated in FIG. 3. The third sub-pixel 13B and the fourth sub-pixel 14B are each greater in size than the first sub-pixel 11B and the second sub-pixel 12B. The first sub-pixel 11B added to the second sub-pixel 12B has a size equal to or greater than a size of the third sub-pixel 13B and has a size equal to or greater than a size of the fourth sub-pixel 14B. The third sub-pixel 13B is identical in size to the fourth sub-pixel 14B. The first sub-pixel 11B is identical in size to the second sub-pixel 12B. When an area ratio of the first sub-pixel 11B, the second sub-pixel 12B, the third sub-pixel 13B, and the fourth sub-pixel 14B is expressed as I to J to K to L, the following expressions hold: $0.65 \le I = J < 1.0$, and $1.0 \le K = L \le 1.35$. FIG. 8 illustrates an exemplary case in which the expression of I to J to K to L=0.744 to 0.744 to 1.256 to 1.256 holds. In this case, the first sub-pixel 11 added to the second sub-pixel 12 has a size equal to or greater than a size of the third sub-pixel 13 and has a size equal to or greater than a size of the fourth sub-pixel 14. Color reproduction by the pixel 10B illustrated in FIG. 8 can be described by reading the first sub-pixel 11, the second sub-pixel 12, the third sub-pixel 13, and the fourth sub-pixel 14 described with reference to FIG. 4 as the first sub-pixel 11B, the second sub-pixel 12B, the third sub-pixel 13B, and the fourth sub-pixel 14B, respectively. In such a pixel, the sub-pixels that are diagonally opposite to each other share no side. More specifically, the pixel is divided into four regions by one vertical line that divides the pixel laterally and one horizontal line that divides the pixel vertically. The vertical line coincides with a centerline that laterally divides the pixel into half. The horizontal line is shifted toward the first sub-pixel (upper edge side of the pixel) with respect to a centerline that vertically divides the pixel into half. This configuration makes the magnitude relation of $I = J < K = L$ hold.

Figure 9:
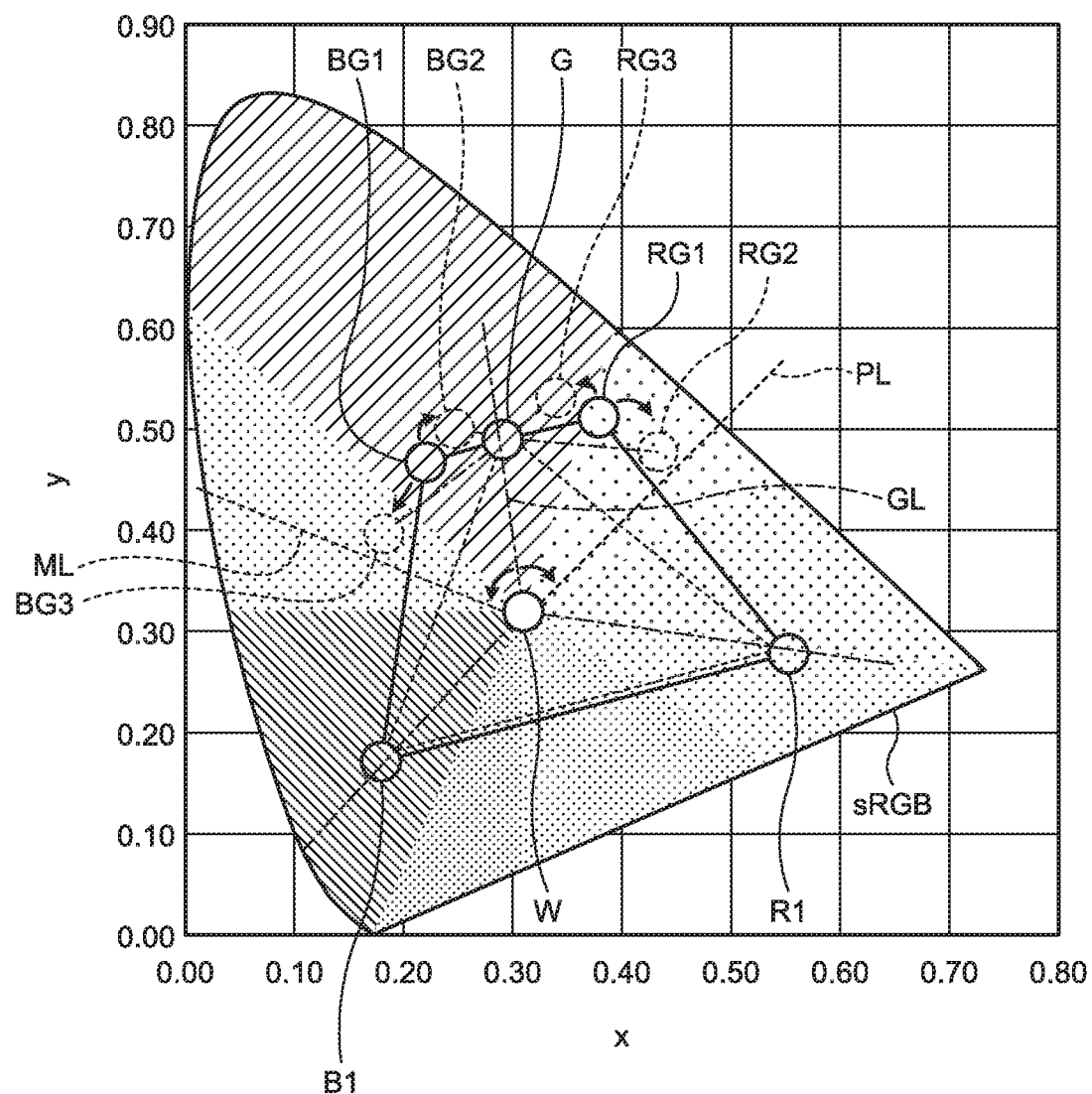
FIG. 9 is a schematic diagram illustrating, in an sRGB color space, a method for determining reddish green and bluish green according to an area ratio of the sub-pixels included in each of different types of a single pixel.

FIG. 9 is a schematic diagram illustrating, in an sRGB color space, a method for determining reddish green and bluish green according to the area ratio of the sub-pixels 15 included in each of the pixel 10, the pixel 10A, and the pixel 10B. FIG. 9 illustrates a dash-single-dot line GL that couples the green G, which is a combined color of the first red green RG1 and the first blue green BG1, with the white point W, while illustrating a broken line PL on the yellow side on which a hue angle is in the positive direction with respect to the dash-single-dot line GL. FIG. 9 illustrates a broken line ML on the cyan side on which the hue angle is in the negative direction with respect to the dash-single-dot line GL.

The first sub-pixel 11A of the pixel 10A illustrated in FIG. 7 is smaller in size than the first sub-pixel 11 of the pixel 10 illustrated in FIG. 3. The second sub-pixel 12A of the pixel 10A illustrated in FIG. 7 is greater in size than the second sub-pixel 12 of the pixel 10 illustrated in FIG. 3. Assume an arrangement in which the color filters 20 of the first sub-pixel 11A and the second sub-pixel 12A included in the pixel 10A illustrated in FIG. 7 are the same as the color filters 20 of the first sub-pixel 11 and the second sub-pixel 12 included in the pixel 10 illustrated in FIG. 3. This arrangement decreases the area allocated to a red component by a relative amount of the reduced first sub-pixel 11A, and increases the area allocated to a blue component by a relative amount of the enlarged second sub-pixel 12A. As illustrated in FIG. 9, the hue angle of the second red green RG2 corresponding to the peak of the spectrum of the light transmitted through the first color filter 20RG2 included in the first sub-pixel 11A illustrated in FIG. 7 is on the positive side relative to the hue angle of the first red green RG1 corresponding to the peak of the spectrum of the light transmitted through the first color filter 20RG1 included in the first sub-pixel 11 illustrated in FIG. 3. The hue angle of the second blue green BG2 corresponding to the peak of the spectrum of the light transmitted through the second color filter 20BG2 included in the second sub-pixel 12A illustrated in FIG. 7 is on the positive side relative to the hue angle of the first blue green BG1 corresponding to the peak of the spectrum of the light transmitted through the second color filter 20BG1 included in the second sub-pixel 12 illustrated in FIG. 3. This configuration allows even the pixel 10A illustrated in FIG.

7 to achieve the required yellow Y, white point W, and green G equivalent to those in the pixel 10 illustrated in FIG. 3.

The third sub-pixel 13B of the pixel 10B illustrated in FIG. 8 is greater in size than the third sub-pixel 13 of the pixel 10 illustrated in FIG. 3. The fourth sub-pixel 14B of the pixel 10B illustrated in FIG. 8 is smaller in size than the fourth sub-pixel 14 of the pixel 10 illustrated in FIG. 3. Assume an arrangement in which the color filters 20 of the first sub-pixel 11B and the second sub-pixel 12B included in the pixel 10B illustrated in FIG. 8 are the same as the color filters 20 of the first sub-pixel 11 and the second sub-pixel 12 included in the pixel 10 illustrated in FIG. 3. This arrangement increases the area allocated to the red component by a relative amount of the enlarged third sub-pixel 13B, and decreases the area allocated to the blue component by a relative amount of the reduced fourth sub-pixel 14B. As illustrated in FIG. 9, the hue angle of the third red green RG3 corresponding to the peak of the spectrum of the light transmitted through the first color filter 20RG3 included in the first sub-pixel 11B illustrated in FIG. 8 is on the negative side relative to the hue angle of the first red green RG1 corresponding to the peak of the spectrum of the light transmitted through the first color filter 20RG1 included in the first sub-pixel 11 illustrated in FIG. 3. The hue angle of the third blue green BG3 corresponding to the peak of the spectrum of the light transmitted through the second color filter 20BG3 included in the second sub-pixel 12B illustrated in FIG. 8 is on the negative side relative to the hue angle of the first blue green BG1 corresponding to the peak of the spectrum of the light transmitted through the second color filter 20BG1 included in the second sub-pixel 12 illustrated in FIG. 3. This configuration allows even the pixel 10B illustrated in FIG. 8 to achieve the required yellow Y, white point W, and green G equivalent to those in the pixel 10 illustrated in FIG. 3.

The first red green RG1, the second red green RG2, and the third red green RG3 have hue on the positive side with respect to the green G and on the negative side with respect to the red R1. The first blue green BG1, the second blue green BG2, and the third blue green BG3 have hue on the negative side with respect to the green G and on the positive side with respect to the blue B1.

As exemplified in FIGS. 3, 7, and 8, in the display device in the embodiment, the four sub-pixels 15 included in the single pixel 10, 10A, or 10B have two or more different types of areas. The sub-pixel 15 including a color filter 20 having a relatively high luminous efficacy has a size equal to or smaller than a size of the sub-pixel 15 including a color filter 20 having a relatively low luminous efficacy. Specifically, the first color filter 20RG1 has a luminous efficacy relatively higher than a luminous efficacy of the second color filter 20BG1. The first color filter 20RG2 has a luminous efficacy relatively higher than a luminous efficacy of the second color filter 20BG2. The first color filter 20RG3 has a luminous efficacy relatively higher than a luminous efficacy of the second color filter 20BG3. Further, the first red green RG1, the second red green RG2, and the third red green RG3, and the first blue green BG1, the second blue green BG2, and the third blue green BG3 each have a luminous efficacy relatively higher than a luminous efficacy of the red R1. The red R1 has a luminous efficacy relatively higher than a luminous efficacy of the blue B1. For the reproduction of yellow, the display device in the embodiment uses three sub-pixels 15 excluding the fourth sub-pixel (e.g., fourth sub-pixel 14) that includes the fourth color filter 20B1. A total area of the three sub-pixels 15 used for reproducing the yellow Y may be equal to or greater than twice the area of the fourth sub-pixel. Alternatively, the three sub-pixels other than the fourth sub-pixel may be used to reproduce yellow regardless of the gradation value or the three sub-pixels other than the fourth sub-pixel may be used to reproduce yellow having a predetermined gradation value or higher. The yellow having the predetermined gradation value or higher refers to yellow having relatively high luminance and saturation as required, that is, yellow exceeding a predetermined halftone. This configuration uses the first sub-pixel (e.g., first sub-pixel 11) and the third sub-pixel (e.g., third sub-pixel 13) to reproduce yellow having the halftone or lower.

The sub-pixels 15 having a relatively high luminance efficacy are adjacent to each other in the X-direction or the Y-direction. For example, in FIG. 3, the first sub-pixel 11 is adjacent to the second sub-pixel 12. In FIG. 7, the first sub-pixel 11A is adjacent to the second sub-pixel 12A. In FIG. 8, the first sub-pixel 11B is adjacent to the second sub-pixel 12B.

In the following description, the hue of the light OL transmitted through the color filter 20 included in a single sub-pixel 15 is regarded as a reference. The two sub-pixels 15 disposed in juxtaposition to one sub-pixel 15 transmit the light OL having a hue closer to the reference than the remaining one sub-pixel 15 does. The sub-pixels 15 are juxtaposed in the X-direction or the Y-direction. For example, in FIG. 3, the hue (first blue green BG1) of the second sub-pixel 12 and the hue (red R1) of the third sub-pixel 13 are closer to the hue (first red green RG1) of the first sub-pixel 11 than the hue (blue B1) of the fourth sub-pixel 14 disposed in a diagonal direction of the first sub-pixel 11 is. The hue (first blue green BG1) of the second sub-pixel 12 and the hue (red R1) of the third sub-pixel 13 are closer to the hue (blue B1) of the fourth sub-pixel 14 than the hue (first red green RG1) of the first sub-pixel 11 disposed in a diagonal direction of the fourth sub-pixel 14 is. The diagonal direction extends along the X-Y plane and intersects the X-direction and the Y-direction. Further, the hue (first red green RG1) of the first sub-pixel 11 and the hue (blue B1) of the fourth sub-pixel 14 are closer to the hue (first blue green BG1) of the second sub-pixel 12 than the hue (red R1) of the third sub-pixel 13 disposed in a diagonal direction of the second sub-pixel 12 is. The hue (first red green RG1) of the first sub-pixel 11 and the hue (blue B1) of the fourth sub-pixel 14 are closer to the hue (red R1) of the third sub-pixel 13 than the hue (first blue green BG1) of the second sub-pixel 12 disposed in a diagonal direction of the third sub-pixel 13 is. Relations of hues among the sub-pixels 15 illustrated in FIG. 7 can be described by reading the first sub-pixel 11, the second sub-pixel 12, the third sub-pixel 13, and the fourth sub-pixel 14 described with reference to FIG. 3 as the first sub-pixel 11A, the second sub-pixel 12A, the third sub-pixel 13A, and the fourth sub-pixel 14A, respectively. Relations of hues among the sub-pixels 15 illustrated in FIG. 8 can be described by reading the first sub-pixel 11, the second sub-pixel 12, the third sub-pixel 13, and the fourth sub-pixel 14 described with reference to FIG. 3 as the first sub-pixel 11B, the second sub-pixel 12B, the third sub-pixel 13B, and the fourth sub-pixel 14B, respectively.

Figure 10:
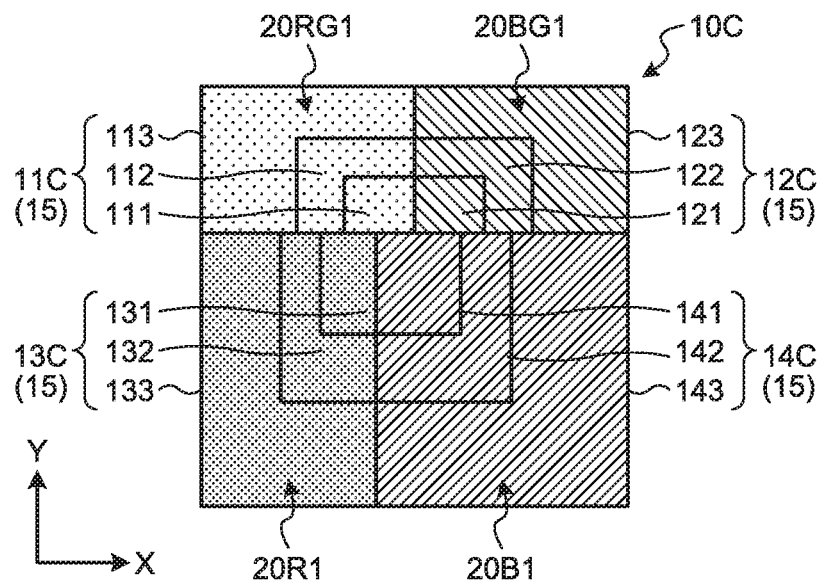
FIG. 10 is a diagram illustrating an example of dividing each sub-pixel into a plurality of regions having different areas for area coverage modulation.

FIG. 10 is a diagram illustrating an example of dividing each sub-pixel 15 into a plurality of regions having different areas for area coverage modulation. In the display device in the embodiment, a pixel 10C includes a first sub-pixel 11C, a second sub-pixel 12C, a third sub-pixel 13C, and a fourth sub-pixel 14C, for example, as illustrated in FIG. 10. The first sub-pixel 11C including the first color filter 20RG1 includes three regions having different areas including a first sub-divided pixel 111, a second sub-divided pixel 112, and a third sub-divided pixel 113. The first sub-divided pixel 111, the second sub-divided pixel 112, and the third sub-divided pixel 113 have an area ratio of, for example, 1 to 2 to 4 (=$2^0$ to $2^1$ to $2^2$). The first sub-pixel 11D has gradation performance of three bits (eight gradations) through combinations of whether each of the first sub-divided pixel 111, the second sub-divided pixel 112, and the third sub-divided pixel 113 transmits light. More specifically, area coverage modulation performed through the combination patters of whether each of the first sub-divided pixel 111, the second sub-divided pixel 112, and the third sub-divided pixel 113 transmits light is expressed as "0 to 0 to 0", "1 to 0 to 0", "0 to 1 to 0", "1 to 1 to 0", "0 to 0 to 1", "1 to 0 to 1", "0 to 1 to 1", and "1 to 1 to 1" in ascending order of an output gradation, where 1 denotes that the specific sub-divided pixel transmits light and 0 denotes that the specific sub-divided pixel does not transmit light. A black matrix 23 (see FIG. 13) is disposed between the sub-pixels 15. For example, the black matrix 23 is disposed among a plurality of color filters 20. For example, the black matrix 23 may be a black filter or may be configured such that the color filters of two adjacent sub-pixels are superimposed on top of one another to reduce a transmission factor in the overlapping part. The black matrix 23 may be omitted. A ratio of area coverage modulation by the sub-divided pixels (e.g., 1 to 2 to 4) corresponds to an aperture ratio in a plan view. Thus, in a configuration including the black matrix 23, the ratio of area coverage modulation corresponds to a ratio of openings on which the black matrix 23 is not disposed. In a configuration without black matrix 23, the ratio of area coverage modulation corresponds to an area ratio of the reflective electrodes 40 included in the respective sub-divided pixels. Specific shapes of the reflective electrodes 40 vary depending on how the sub-pixel is divided. For example, in FIG. 10, the reflective electrodes 40 having a rectangular shape, an L-shape, and an L-shape are provided from the central side of the pixel 10C with the respective sub-divided pixels.

The second sub-pixel 12C including the second color filter 20BG1 includes a plurality of sub-divided pixels that may be a first sub-divided pixel 121, a second sub-divided pixel 122, and a third sub-divided pixel 123. The third sub-pixel 13C including the third color filter 20R1 includes a plurality of sub-divided pixels that may be a first sub-divided pixel 131, a second sub-divided pixel 132, and a third sub-divided pixel 133. The fourth sub-pixel 14C including the fourth color filter 20B1 includes a plurality of sub-divided pixels that may be a first sub-divided pixel 141, a second sub-divided pixel 142, and a third sub-divided pixel 143. The second sub-pixel 12C, the third sub-pixel 13C, and the fourth sub-pixel 14C each achieve the area coverage modulation through the same mechanism as that of the first sub-pixel 11C.

The first sub-pixel 11C, the second sub-pixel 12C, the third sub-pixel 13C, and the fourth sub-pixel 14C are configured in the same manner as the first sub-pixel 11, the second sub-pixel 12, the third sub-pixel 13, and the fourth sub-pixel 14 described above, respectively, except that the first sub-pixel 11C, the second sub-pixel 12C, the third sub-pixel 13C, and the fourth sub-pixel 14C each include the sub-divided pixels. The sub-pixels 15 included in the pixel 10A illustrated in FIG. 7 and the pixel 10B illustrated in FIG. 8 may each be divided into a plurality of sub-divided pixels like the sub-pixels 15 included in the pixel 10C illustrated in FIG. 10.

Figure 11:
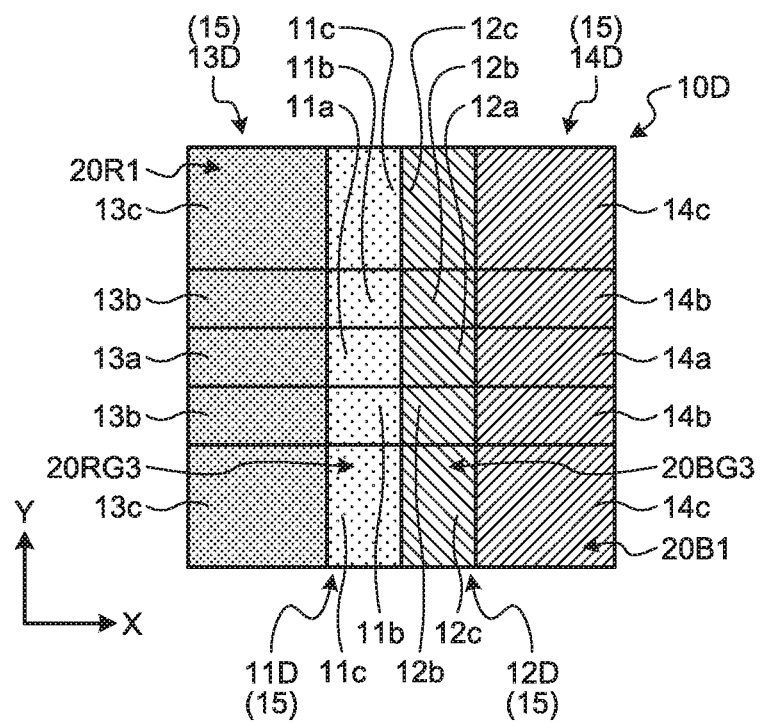
FIG. 11 is a diagram illustrating another example of dividing each sub-pixel into a plurality of regions having different areas for area coverage modulation.

FIG. 11 is a diagram illustrating another example of dividing each sub-pixel 15 into a plurality of regions having different areas for area coverage modulation. Shapes and arrangements of the sub-pixels 15 exemplified in FIGS. 3, 7, 8, and 10 are illustrative only and can be modified as appropriate. As illustrated in FIG. 11, for example, a pixel 10D includes the sub-pixels 15 including a third sub-pixel 13D, a first sub-pixel 11D, a second sub-pixel 12D, and a fourth sub-pixel 14D sequentially arranged from one end side in the X-direction. The sub-pixels 15 each have a stripe shape. These sub-pixels have widths in the X-direction, the relation of which is expressed as follows: width of the first sub-pixel=width of the second sub-pixel<width of the third sub-pixel=width of the fourth sub-pixel. The first sub-pixel 11D including the first color filter 20RG3 includes a plurality of sub-divided pixels that may be a first sub-divided pixel 11a, second sub-divided pixels 11b, and third sub-divided pixels 11c. An area ratio among the central first sub-divided pixel 11a, a pair of the upper and lower second sub-divided pixels 11b, and a pair of the upper and lower third sub-divided pixels 11c is, for example, 1 to 2 to 4. The first sub-pixel 11C has gradation performance of three bits (eight gradations) through combinations of whether each of the first sub-divided pixel 11a, the second sub-divided pixel 11b, and the third sub-divided pixel 11c transmits light. The second sub-pixel 12D including the second color filter 20BG3 includes a plurality of sub-divided pixels that may be a first sub-divided pixel 12a, second sub-divided pixels 12b, and third sub-divided pixels 12c. The third sub-pixel 13D including the third color filter 20R1 includes a plurality of sub-divided pixels that may be a first sub-divided pixel 13a, second sub-divided pixels 13b, and third sub-divided pixels 13c. The fourth sub-pixel 14D including the fourth color filter 20B1 includes a plurality of sub-divided pixels that may be a first sub-divided pixel 14a, second sub-divided pixels 14b, and third sub-divided pixels 14c. The second sub-pixel 12D, the third sub-pixel 13D, and the fourth sub-pixel 14D each achieve the area coverage modulation through the same mechanism as that of the first sub-pixel 11D.

The first sub-pixel 11D, the second sub-pixel 12D, the third sub-pixel 13D, and the fourth sub-pixel 14D are configured in the same manner as the first sub-pixel 11B, the second sub-pixel 12B, the third sub-pixel 13B, and the fourth sub-pixel 14B described above, respectively, except that the first sub-pixel 11D, the second sub-pixel 12D, the third sub-pixel 13D, and the fourth sub-pixel 14D each include the sub-divided pixels. FIG. 11 illustrates a case in which an area ratio among the first sub-pixel 11D, the second sub-pixel 12D, the third sub-pixel 13D, and the fourth sub-pixel 14D is the same as that among the first sub-pixel 11B, the second sub-pixel 12B, the third sub-pixel 13B, and the fourth sub-pixel 14B illustrated in FIG. 8. However, the present disclosure is not limited thereto. The area ratio of the stripe-shaped sub-pixels 15 as illustrated in FIG. 11 may be set to be the same as that of the first sub-pixel 11, the second sub-pixel 12, the third sub-pixel 13, and the fourth sub-pixel 14 illustrated in FIG. 3 or as that of the first sub-pixel 11A, the second sub-pixel 12A, the third sub-pixel 13A, and the fourth sub-pixel 14A illustrated in FIG. 7. Further, in the stripe-shaped sub-pixels 15 as illustrated in FIG. 11, two sub-pixels 15 adjacent to one sub-pixel 15 that serves as a reference preferably have a hue closer to the hue of the reference sub-pixel 15 than the hue of the remaining one sub-pixel 15. In the example illustrated in FIG. 11, the one sub-pixel 15 that serves as the reference is the first sub-pixel 11D or the second sub-pixel 12G.

As described above, the sub-pixels 15 illustrated in FIGS. 10 and 11 are each divided into a plurality of sub-divided pixels having different areas. Gradation expression for each of the sub-pixels 15 is performed through a combination of whether each of the sub-divided pixels transmits light. The number of sub-divided pixels included in a single sub-pixel 15 may be two, or four or more. Gradation performance of a single sub-pixel 15 in the area coverage modulation is indicated by the number of bits (N bits) corresponding to the number (N) of the sub-divided pixels, where N is a natural number of 2 or greater. Assuming that the area of the smallest sub-divided pixel is 1, the q-th (q-th bit) sub-divided pixel from the smallest sub-divided pixel has an area of $2^{(q-1)}$.

The following describes a detailed configuration of a display device 1 in the embodiment with reference to FIGS. 12 to 17. In the description with reference to FIGS. 12 to 17, one of a plurality of sub-divided pixels will be referred to as a "sub-divided pixel 50".

Figure 12:
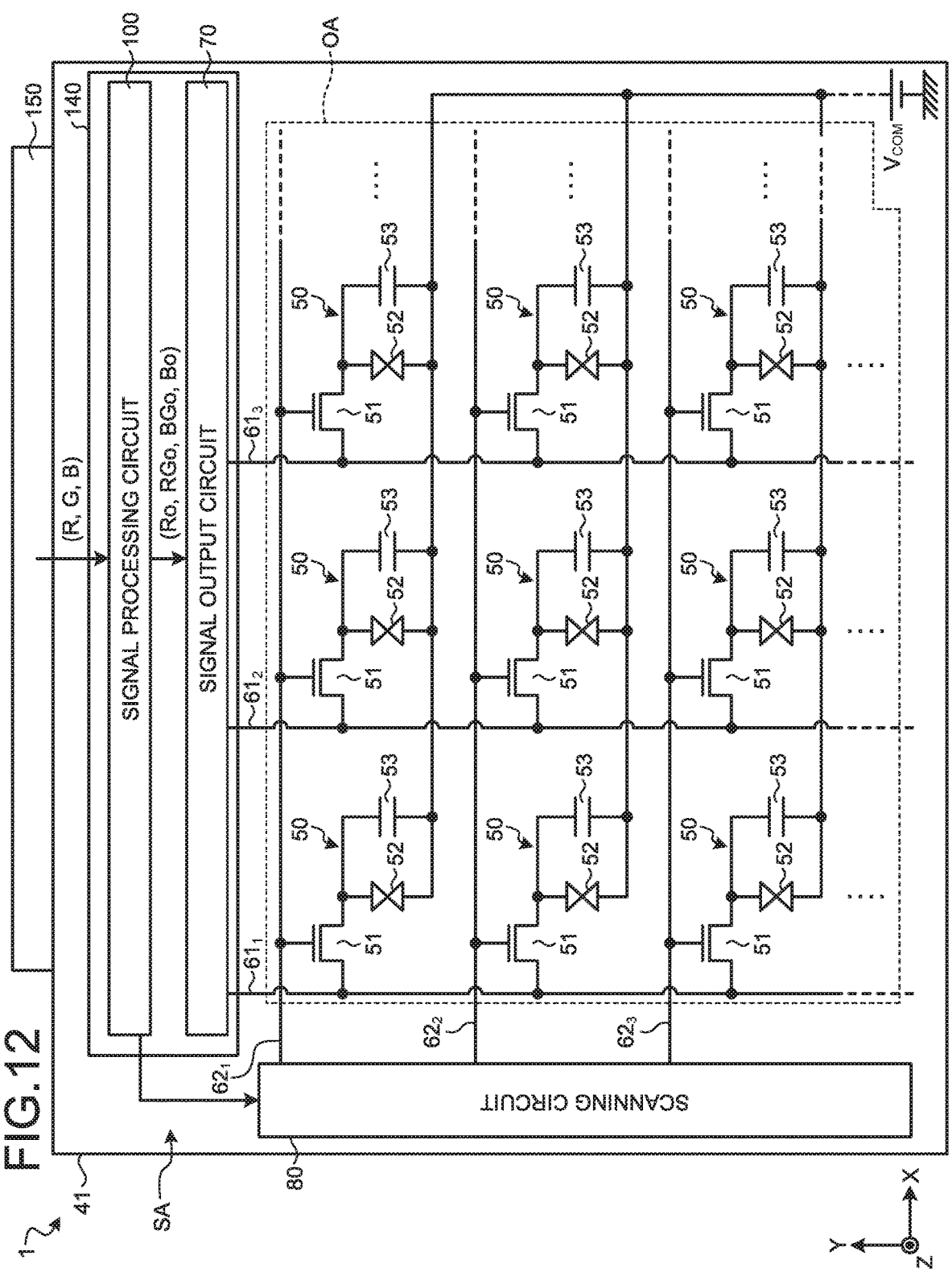
FIG. 12 is a diagram illustrating an exemplary circuit configuration of a display device in the embodiment.

FIG. 12 is a diagram illustrating an exemplary circuit configuration of the display device in the embodiment. The X-direction in FIG. 12 indicates a row direction of the display device 1, and the Y-direction in FIG. 12 indicates a column direction of the display device 1. As illustrated in FIG. 12, the sub-divided pixel 50 includes, for example, a pixel transistor 51 employing a thin-film transistor (TFT), a liquid crystal capacitor 52, and a holding capacitor 53. The pixel transistor 51 has a gate electrode coupled with a scanning line 62 ($62_1$, $62_2$, $62_3$, . . . ) and a source electrode coupled with a signal line 61 ($61_1$, $61_2$, $61_3$, . . . ).

The liquid crystal capacitor 52 denotes a capacitance component of a liquid crystal material generated between the reflective electrode 40 provided for each sub-divided pixel 50 and a counter electrode 22 (see FIG. 13) facing some of or all of the reflective electrodes 40. The reflective electrode 40 is coupled with a drain electrode of the pixel transistor 51. A common potential $V_{COM}$ is applied to the counter electrode 22. The common potential $V_{COM}$ is inverted at predetermined cycle in order to inversely drive the sub-divided pixel 50 (see FIG. 15). The holding capacitor 53 has two electrodes. One of the electrodes has a potential identical to that of the reflective electrode 40 and the other of the electrodes has a potential identical to that of the counter electrode 22.

The pixel transistor 51 is coupled with the signal line 61 extending in the column direction and the scanning line 62 extending in the row direction. The sub-divided pixel 50 is at an intersection of the signal line 61 and the scanning line 62 in the display area OA. The signal lines 61 ($61_1$, $61_2$, $61_3$, . . . ) each have one end coupled with an output terminal corresponding to each column of a signal output circuit 70. The scanning lines 62 ($62_1$, $62_2$, $62_3$, . . . ) each have one end coupled with an output terminal corresponding to each row of a scanning circuit 80. The signal lines 61 ($61_1$, $61_2$, $61_3$, . . . ) each transmit a signal for driving the sub-divided pixels 50, i.e., a video signal output from the signal output circuit 70, to the sub-divided pixels 50, on a pixel column by pixel column basis. The scanning lines 62 ($62_1$, $62_2$, $62_3$, . . . ) each transmit a signal for selecting the sub-divided pixels 50 row by row, i.e., a scanning signal output from the scanning circuit 80, to each pixel row.

The signal output circuit 70 and the scanning circuit 80 are coupled with a signal processing circuit 100. The signal processing circuit 100 calculates a gradation value (R1, RG, BG, and B1 to be described later) of each of four sub-pixels 15 included in each pixel (e.g., pixel 10) according to the input gradation values of RGB. The signal processing circuit 100 outputs to the signal output circuit 70 a calculation result as area coverage modulation signals (Ro, RGo, BGo, and Bo) of each pixel. The signal output circuit 70 transmits to each sub-divided pixel 50 the video signal including the area coverage modulation signals (Ro, RGo, BGo, and Bo). The signal processing circuit 100 also outputs to the signal output circuit 70 and the scanning circuit 80 clock signals that synchronize operations of the signal output circuit 70 and the scanning circuit 80. The scanning circuit 80 scans the sub-divided pixels 50 in synchronism with the video signal from the signal output circuit 70. The embodiment may employ a configuration in which the signal output circuit 70 and the signal processing circuit 100 are included in a single IC chip 140, or a configuration in which the signal output circuit 70 and the signal processing circuit 100 are individual circuit chips. FIG. 12 illustrates circuit chips including the IC chip 140, in a peripheral region SA of a first substrate 41 using a Chip-On-Glass (COG) technique. This is merely one example of implementation of the circuit chips, and the present disclosure is not limited thereto. The circuit chip may be mounted on, for example, a flexible printed circuit (FPC) coupled with the first substrate 41, using a Chip-On-Film (COF) technique.

Figure 13:
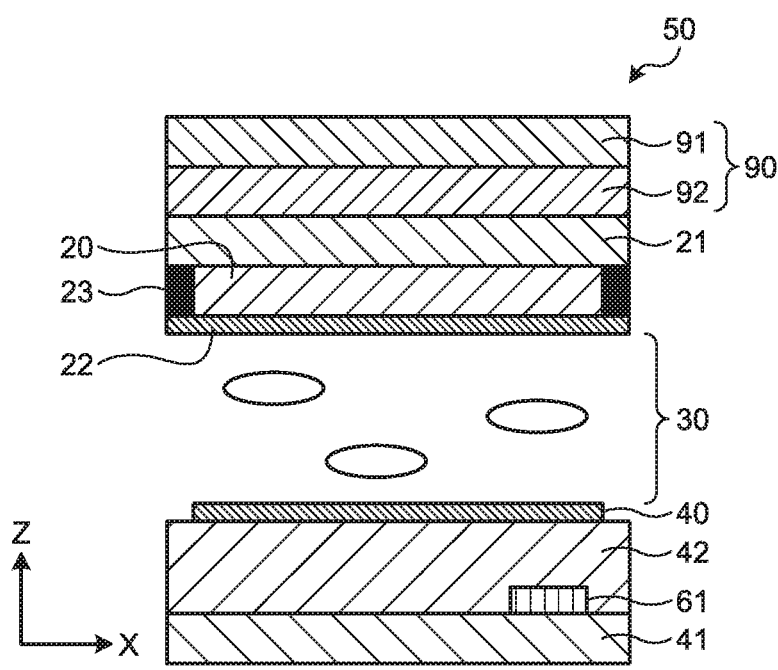
FIG. 13 is a cross-sectional view schematically illustrating a sub-divided pixel.

FIG. 13 is a cross-sectional view schematically illustrating the sub-divided pixel 50. The reflective electrode 40 faces the counter electrode 22 with the liquid crystal layer 30 interposed therebetween. The reflective electrode 40 is provided to the first substrate 41. Specifically, wiring including the signal line 61, and an insulation layer 42 are stacked on a surface of the first substrate 41, the surface facing the liquid crystal layer 30. The insulation layer 42 insulates one wiring from another wiring and from electrodes. The reflective electrode 40 is a film-shaped electrode formed on a surface of the insulation layer 42. The counter electrode 22 and the color filter 20 are disposed on a second substrate 21. Specifically, the color filter 20 is disposed on a surface of the second substrate 21, the surface facing the liquid crystal layer 30. The black matrix 23 is disposed among the color filters 20. The counter electrode 22 is a film-shaped electrode formed on a surface of the color filter 20.

The sub-divided pixel 50 illustrated in FIG. 13 represents one of the sub-divided pixels provided for gradation expression by area coverage modulation described above with reference to FIGS. 10 and 11. Specifically, each of the sub-divided pixels includes an individual reflective electrode 40. The reflective electrode 40 faces the counter electrode 22 with the liquid crystal layer 30 interposed therebetween.

The first substrate 41 and the second substrate 21 are, for example, glass substrates that transmit light. The counter electrode 22 transmits light and is formed of, for example, indium tin oxide (ITO). The reflective electrode 40 is a metal electrode that is formed of thin film silver (Ag), for example, and that reflects light.

The liquid crystal layer 30 is sealed with a sealing material, which is not illustrated. The sealing material seals the liquid crystal layer 30 by bonding the first substrate 41 and the second substrate 21 at their ends. A spacer, which is not illustrated, determines a distance between the reflective electrode 40 and the counter electrode 22. An initial orientation state of liquid crystal molecules of the liquid crystal layer 30 is determined by orientation films (not illustrated) provided to the respective first and second substrates 41 and 21. The liquid crystal molecules do not transmit light in the initial orientation state. The state of not transmitting light in the initial orientation state in which no electric field is applied to the liquid crystal layer 30 is referred to as normally black.

The spectrum of the light OL transmitted through the color filter 20 illustrated in FIG. 13 has a peak that falls on either one of the spectrum of reddish green, the spectrum of bluish green, the spectrum of red, and the spectrum of blue, as described with reference to FIGS. 3, 7, and 8.

As described above, the display device 1 includes: the first substrate 41 provided with the reflective electrode 40; the second substrate 21 provided with the color filter 20 and the translucent electrode (counter electrode 22); and the liquid crystal layer 30 disposed between the reflective electrode 40 and the translucent electrode. As described with reference to FIG. 1, the light modulation layer 90, for example, to modulate the scattering direction of the light OL emitted from the display device, may be provided to the second substrate 21 on the opposite side of the liquid crystal layer 30. The light modulation layer 90 includes, for example, a polarizing plate 91 and a scattering layer 92. The polarizing plate 91 faces a display surface. The scattering layer 92 is disposed between the polarizing plate 91 and the second substrate 21. The polarizing plate 91 prevents glare by transmitting beams of light polarized in a specific direction. The scattering layer 92 scatters the light OL reflected by the reflective electrode 40.

The display device 1 in the embodiment employs the sub-divided pixel 50 according to a memory-in-pixel (MIP) technology to have a memory function. According to the MIP technology, the sub-divided pixel 50 has a memory to store data, thereby allowing the display device 1 to perform display in a memory display mode. The memory display mode allows the gradation of the sub-divided pixel 50 to be digitally displayed based on binary information (logic "1" and logic "0") stored in the memory in the sub-divided pixel 50.

Figure 14:
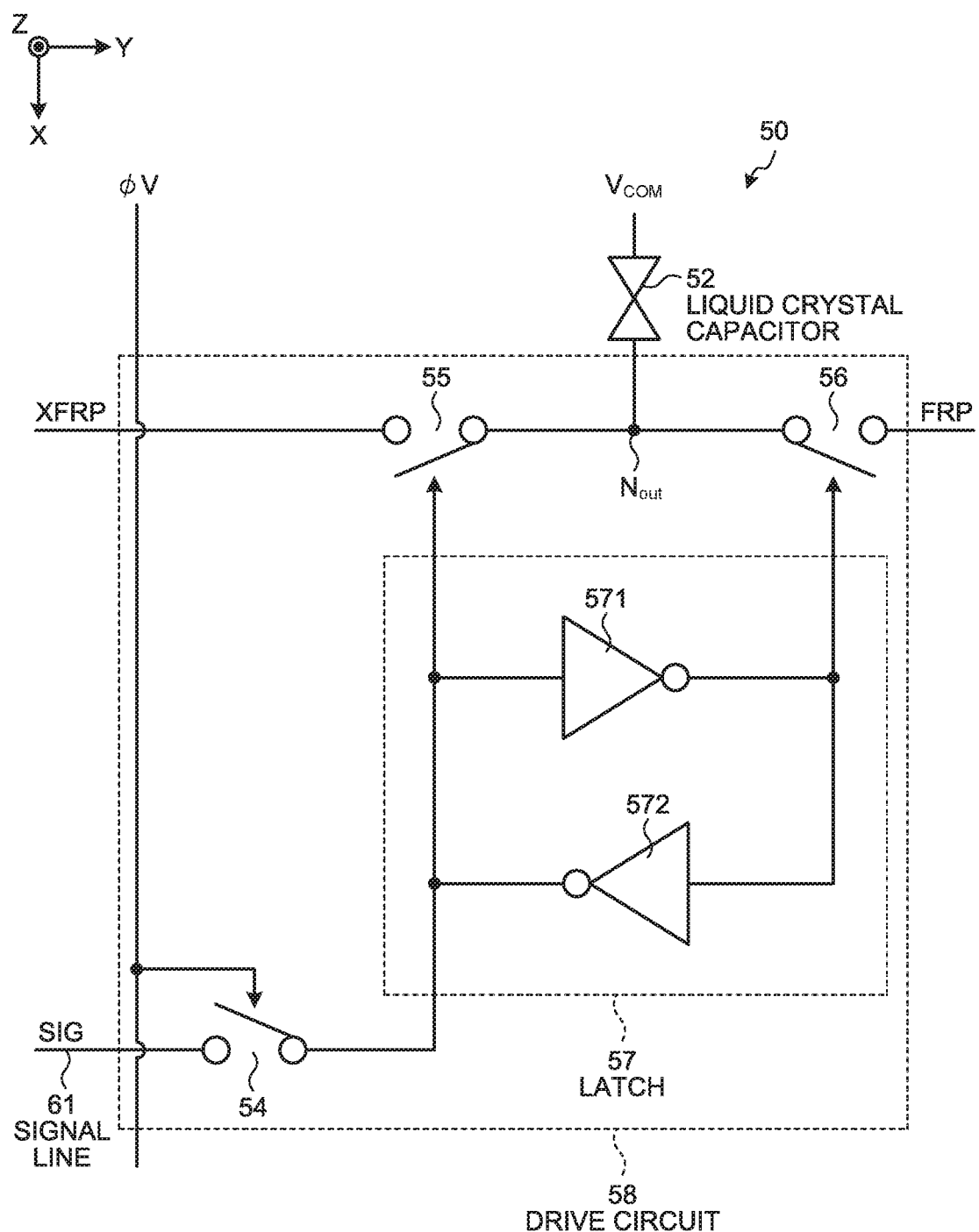
FIG. 14 is a block diagram illustrating an exemplary circuit configuration of the pixel employing a memory in pixel (MIP) technology.
Figure 15:
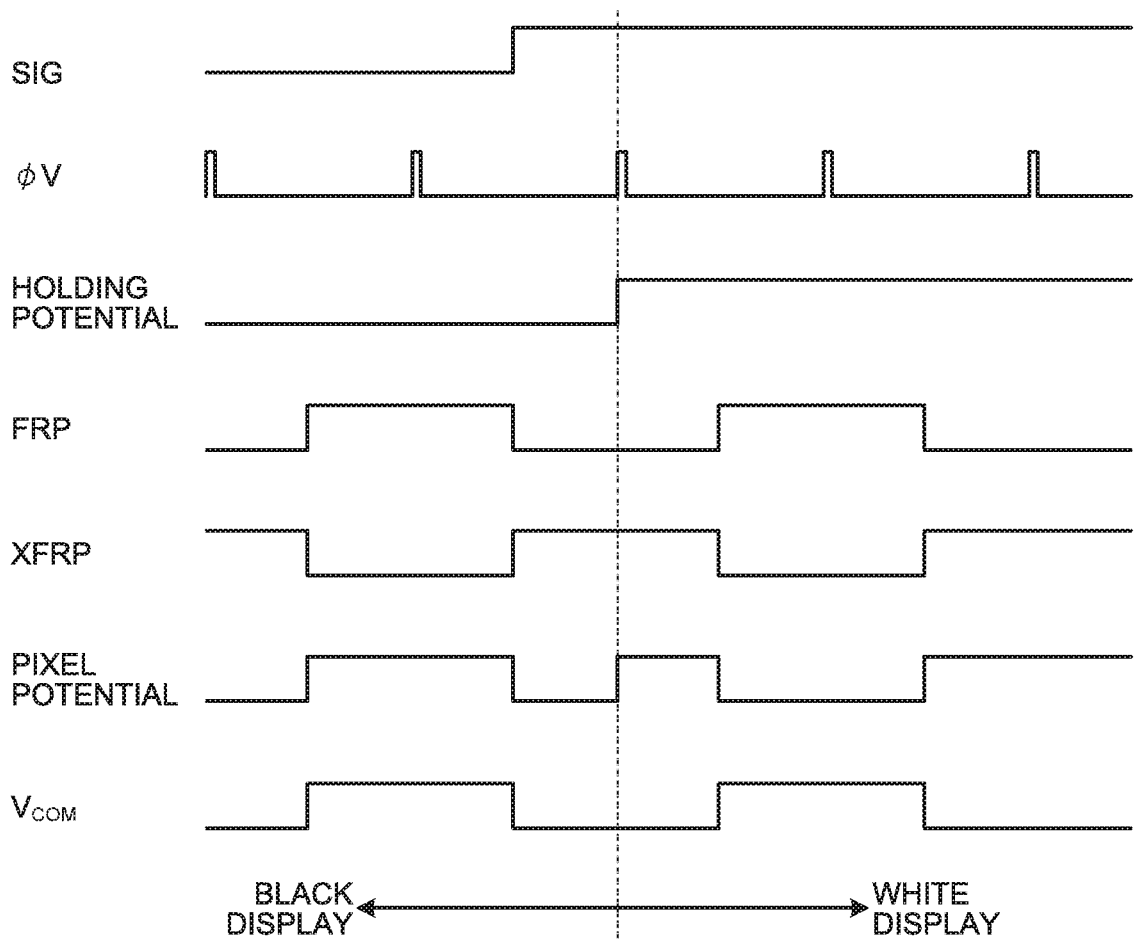
FIG. 15 is a timing chart for explaining an operation of the pixel employing the MIP technology.

FIG. 14 is a block diagram illustrating an exemplary circuit configuration of the sub-divided pixel 50 employing the MIP technology. FIG. 15 is a timing chart for explaining an operation of the sub-divided pixel 50 employing the MIP technology. As illustrated in FIG. 14, the sub-divided pixel 50 includes a drive circuit 58 in addition to the liquid crystal capacitor (liquid crystal cell) 52. The drive circuit 58 includes three switching devices 54, 55, and 56 and a latch 57. The drive circuit 58 has a static random access memory (SRAM) function. The sub-divided pixel 50 including the drive circuit 58 is configured to have the SRAM function.

The switching device 54 has one end coupled with the signal line 61. The switching device 54 is turned ON (closed) by a scanning signal ϕV applied from the scanning circuit 80, so that the drive circuit 58 obtains data SIG supplied from the signal output circuit 70 via the signal line 61. The latch 57 includes inverters 571 and 572. The inverters 571 and 572 are coupled in parallel with each other in directions opposite to each other. The latch 57 latches a potential corresponding to the data SIG obtained through the switching device 54.

A control pulse XFRP having a phase opposite to that of the common potential $V_{COM}$ is applied to one terminal of the switching device 55. A control pulse FRP having a phase identical to that of the common potential $V_{COM}$ is applied to one terminal of the switching device 56. The switching devices 55 and 56 each have the other terminal coupled with a common connection node. The common connection node serves as an output node $N_{out}$. Either one of the switching devices 55 and 56 is turned ON depending on a polarity of the holding potential of the latch 57. Through the foregoing operation, the control pulse FRP or the control pulse XFRP is applied to the reflective electrode 40 while the common potential $V_{COM}$ is being applied to the counter electrode 22 that generates the liquid crystal capacitor 52.

When the holding potential of the latch 57 has a negative polarity, the pixel potential of the liquid crystal capacitor 52 is in the same phase with that of the common potential $V_{COM}$, causing no potential difference between the reflective electrode 40 and the counter electrode 22. Thus, no electric field is generated in the liquid crystal layer 30. Consequently, the liquid crystal molecules are not twisted from the initial orientation state and the normally black state is maintained. As a result, light is not transmitted in this sub-divided pixel 50. On the other hand, when the holding potential of the latch 57 has a positive polarity, the pixel potential of the liquid crystal capacitor 52 is in an opposite phase of that of the common potential $V_{COM}$, causing a potential difference between the reflective electrode 40 and the counter electrode 22. An electric field then is generated in the liquid crystal layer 30. The electric field causes the liquid crystal molecules to be twisted from the initial orientation state and to change orientation thereof. Thus, light is transmitted in the sub-divided pixel 50 (light transmitted state). As described above, in the display device 1, the sub-divided pixels each include a holder (latch 57) that holds a potential variable according to gradation expression.

In each sub-divided pixel 50, the control pulse FRP or the control pulse XFRP is applied to the reflective electrode 40 generating the liquid crystal capacitor 52 when either one of the switching devices 55 and 56 is turned ON depending on the polarity of the holding potential of the latch 57. Transmission of light is thereby controlled for the sub-divided pixel 50.

The foregoing describes the example in which the sub-divided pixel 50 employs the SRAM as a memory incorporated in the sub-divided pixel 50. The SRAM is, however, illustrative only and the embodiment may employ other types of memory, for example, a dynamic random access memory (DRAM).

Figure 16:
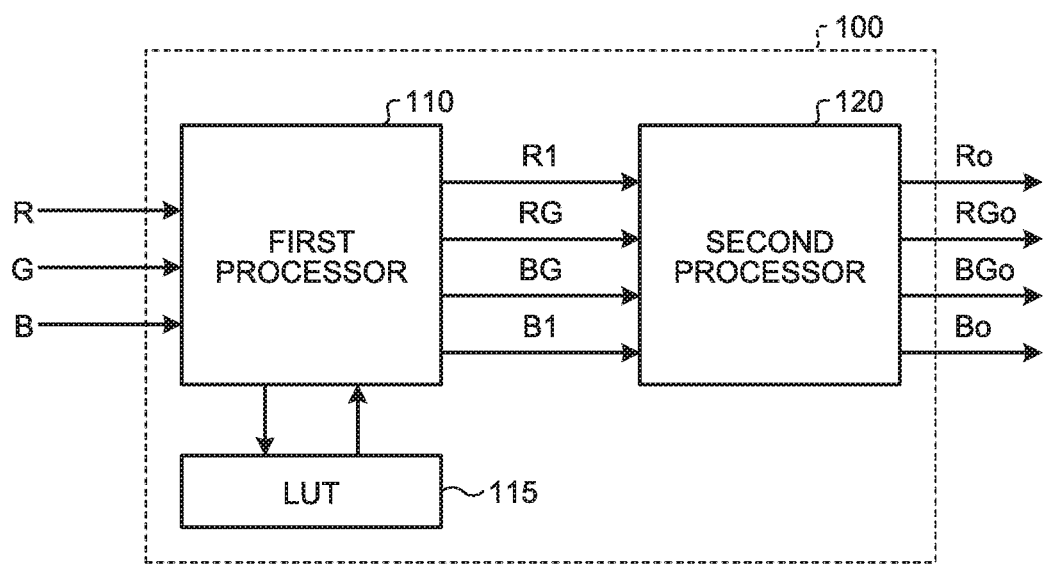
FIG. 16 is a block diagram illustrating an exemplary configuration of a signal processing circuit.

FIG. 16 is a block diagram illustrating an exemplary configuration of the signal processing circuit. The signal processing circuit 100 includes a first processor 110, a second processor 120, and a look-up table (LUT) 115. The first processor 110 identifies the gradation values (R1, RG, BG, and B1) of the respective four sub-pixels 15 included in each pixel (e.g., pixel 10) according to the input gradation values of R, G, and B. The gradation value of "RG" out of the gradation values (R1, RG, BG, and B1) of the respective four sub-pixels 15 is the gradation value of either one of the first red green RG1, the second red green RG2, and the third red green RG3, for example.

Specifically, "RG" corresponds to the peak of the spectrum of the light transmitted through the first color filter included in the first sub-pixel. The gradation value of "BG" is the gradation value of either one of, for example, the first blue green BG1, the second blue green BG2, and the third blue green BG3. Specifically, "BG" corresponds to the peak of the spectrum of the light transmitted through the second color filter included in the second sub-pixel. The gradation value of "R1" is the gradation value of the red (R1), for example. Specifically, "R1" corresponds to the peak of the spectrum of the light transmitted through the third color filter included in the third sub-pixel. Further, the gradation value of "B1" is the gradation value of the blue (B1), for example. Specifically, "B1" corresponds to the peak of the spectrum of the light transmitted through the fourth color filter included in the fourth sub-pixel.

The LUT 115 is table data including the information on the gradation values of the respective four sub-pixels 15 predetermined for the gradation values of R, G, and B. The following describes an example in which the LUT 115 determines the gradation value of each of the first sub-pixel 11, the second sub-pixel 12, the third sub-pixel 13, and the fourth sub-pixel 14 illustrated in FIG. 3. The first processor 110 refers to the LUT 115 and identifies the gradation values of (R1, RG1, BG1, and B1) corresponding to the input gradation values of R, G, and B. For example, when the input gradation values of R, G, and B are expressed as (R, G, B)=(n, n, n) as illustrated in FIG. 4, the first processor 110 refers to the LUT 115 and identifies the gradation values as (R1, RG1, BG1, B1)=(n1, n2, n3, n4), where (n1, n2, n3, n4) represent colors of the first sub-pixel 11, the second sub-pixel 12, the third sub-pixel 13, and the fourth sub-pixel 14 and are gradation values for reproducing colors corresponding to (R, G, B)=(n, n, n). The same applies to a case in which the input gradation values of R, G, and B are other gradation values. When the input gradation values of R, G, and B are expressed as (R, G, B)=(n, 0, 0), the first processor 110 identifies the gradation values as (R1, RG1, BG1, B1)=(n, 0, 0, 0). When the input gradation values of R, G, and B are expressed as (R, G, B)=(0, n, 0), the first processor 110 identifies the gradation values as (R1, RG1, BG1, B1)=(0, n5, n6, 0). When the input gradation values of B, G, and B are expressed as (R, G, B)=(0, 0, n), the first processor 110 identifies the gradation values as (R1, RG1, BG1, B1)=(0, 0, 0, n). When the input gradation values of R, G, and B are expressed as (R, G, B)=(m, m, 0), the first processor 110 identifies the gradation values as (R1, RG1, BG1, B1)=(m1, m2, m3, 0). When the input gradation values of R, G, and B are expressed as (R, G, B)=(0, m, m), the first processor 110 identifies the gradation values as (R1, RG1, BG1, B1)=(0, m4, m5, m6). When the input gradation values of R, G, and B are expressed as (R, G, B)=(m, 0, m), the first processor 110 identifies the gradation values as (R1, RG1, BG1, B1)=(m7, 0, 0, m8).

The second processor 120 outputs to the signal output circuit 70 the area coverage modulation signals (Ro, RGo, BGo, and Bo) corresponding to the respective sub-divided pixels associated with the gradation values (R1, RG, BG, and B1) (e.g., R1, RG1, BG1, and B1) of the respective four sub-pixels 15. For example, when the gradation values of the colors of (R1, RG1, BG1, and B1) identified by the first processor 110 are 8-bit numeric values (0 to 255), the second processor 120 divides the 8-bit numeric values into $2^N$ segments for conversion into N-bit gradation values. When N=3, for example, a correspondence relation between the N-bit gradation values (0 to 7) and the 8-bit gradation values (0 to 255) may be classified as follows: 0: 0 to 31; 1: 32 to 63; 2: 64 to 95; 3: 96 to 127; 4: 128 to 159; 5: 160 to 191; 6: 192 to 223; and 7: 224 to 255. The foregoing classification example assumes the gradation values corresponding to a linear space ranging from 0 to 1.0 in which the gradation values are not subjected to gamma correction. When the gamma correction is performed, a classification may be changed. In accordance with the foregoing correspondence relation, the second processor 120 converts the 8-bit numeric values representing the gradation values of the colors of (R1, RG1, BG1, and B1) into the corresponding N-bit gradation values. For example the second processor 120 converts the gradation values of (R1, RG1, BG1, B1)=(10, 100, 200, 255) to the area coverage modulation signals of (Ro, RGo, BGo, Bo)=(0, 4, 6, 7), and outputs the area coverage modulation signals to the signal output circuit 70. The foregoing processing achieves expression of the input gradation values through the area coverage modulation.

Figure 17:
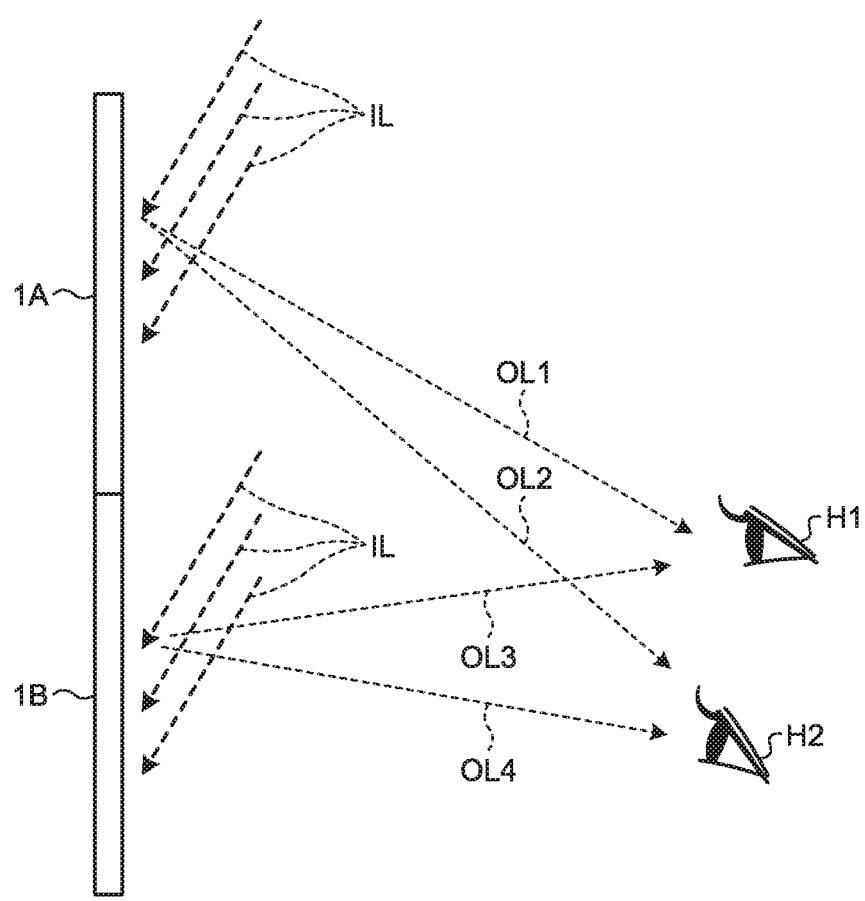
FIG. 17 is a diagram schematically illustrating an exemplary relation among external light, reflected light, and user's viewpoints when a plurality of display devices are disposed in juxtaposition.

FIG. 17 is a diagram schematically illustrating an exemplary relation among the external light IL, reflected light OL1, OL2, OL3, and OL4, and user's viewpoints H1 and H2 when a plurality of display devices 1A and 1B are disposed in juxtaposition. Each of the display devices 1A and 1B is the display device in the embodiment (e.g., display device 1). The reflected light OL1, OL2, OL3, and OL4 represent beams of light OL having exit angles different from each other. As illustrated in FIG. 17, when the display devices 1A and 1B are disposed in juxtaposition, for example, beams of light OL having different exit angles from the display devices 1A and 1B may be viewed even with an incident angle of incident light IL on the display device 1A being identical to an incident angle of incident light IL on the display device 1B. In this case, with respect to the user's viewpoint H1, the reflected light OL from the display device 1A is the reflected light OL1, and the reflected light OL from the display device 1B is the reflected light OL3. Which of the reflected light OL1 or the reflected light OL2 from the display device 1A is viewed by the user is changed depending on which of the user's viewpoint H1 or the user's view point H2 is assumed. Similarly, which of the reflected light OL3 or the reflected light OL4 from the display device 1B is viewed by the user is changed depending on which of the user's viewpoint H1 or the user's view point H2 is assumed. Consequently, the exit angle of the light OL viewed by the user may vary depending on conditions, such as how the display devices 1A and 1B are disposed, and where the user's viewpoint is. Thus, the display device 1A may be configured differently from the display device 1B without departing from the scope of the present disclosure. For example, either one of the display devices 1A and 1B may employ the area ratio of the four sub-pixels 15 as illustrated in any one of FIGS. 3, 7, and 8, and the other of the display devices 1A and 1B may employ the area ratio of the four sub-pixels 15 as illustrated in the other one of FIGS. 3, 7, and 8. Alternatively, the correspondence relation between the input (gradation values of R, G, and B) and (R1, RG, BG, and B1) in the LUT 115 of the display device 1A may be made different from the correspondence relation between the input (gradation values of R, G, and B) and (R1, RG, BG, and B1) in the LUT 115 of the display device 1B.

As described above, in the reflective display device in the embodiment, the third sub-pixel and the fourth sub-pixel are each greater in size than the first sub-pixel and the second sub-pixel. The first sub-pixel added to the second sub-pixel has a size equal to or greater than the size of the third sub-pixel and has a size equal to or greater than the size of the fourth sub-pixel. The first sub-pixel includes the third color filter that has a spectrum peak falling on the spectrum of reddish green. The second sub-pixel includes the fourth color filter that has a spectrum peak falling on the spectrum of bluish green. The third sub-pixel includes the first color fitter that has a spectrum peak falling on the spectrum of red. The fourth sub-pixel includes the second color filter that has a spectrum peak falling on the spectrum of blue. The foregoing arrangements can further increase the luminance and saturation of yellow, thereby reliably achieving the required luminance and saturation of yellow (e.g., yellow Y).

Making the fourth sub-pixel greater in size than the third sub-pixel allows the hue of the spectrum of light transmitted through the color filters included in the first sub-pixel and the second sub-pixel to be more on the positive side. This configuration allows the light transmission efficiency of the color filters included in the first sub-pixel and the second sub-pixel to be more easily increased. Accordingly, the configuration further increases the luminance and saturation of yellow, thereby reliably achieving the required luminance and saturation of yellow (e.g., yellow Y).

Making the second sub-pixel greater in size than the first sub-pixel allows the hue of the spectrum of light transmitted through the color filter included in the first sub-pixel to be more on the positive side. This configuration allows the light transmission efficiency of the color filter included in the first sub-pixel to be more easily increased. Accordingly, the configuration further increases the luminance and saturation of yellow, thereby reliably achieving the required luminance and saturation of yellow (e.g., yellow Y).

The first sub-pixel, the second sub-pixel, and the third sub-pixel in combination reproduce yellow. This configuration car allocate a greater area of color filters and reflective electrodes combining the first sub-pixel, the second sub-pixel, and the third sub-pixel out of the display area of a single pixel to the reproduction of yellow. Consequently, the configuration can reliably achieve the required luminance and saturation of yellow (e.g., yellow Y).

The first sub-pixel and the second sub-pixel in combination reproduce green. This configuration can allocate a greater area of color filters and reflective electrodes combining the first sub-pixel and the second sub-pixel out of the display area of a single pixel to the reproduction of green.

The first sub-pixel is adjacent to the second sub-pixel. This arrangement allows green to be reproduced more uniformly.

A display device operable with lower power consumption can be provided by the sub-divided pixels performing the area coverage modulation The sub-divided pixels each include a holder that holds a potential variable according to gradation expression. This configuration allows the display device to further reduce power consumption.

The present disclosure can naturally provide other advantageous effects that are provided by the aspects described in the embodiments above and are clearly defined by the description in the present specification or appropriately conceivable by those skilled in the art.

What is claimed is:

1. A display device comprising:
a plurality of pixels each consisting of four sub-pixels, each of the plurality of pixels consisting of:
a first sub-pixel including a first color filter that transmits light having a spectrum peak falling on a spectrum of reddish green;
a second sub-pixel including a second color filter that transmits light having a spectrum peak falling on a spectrum of bluish green;
a third sub-pixel including a third color filter that transmits light having a spectrum peak falling on a spectrum of red; and
a fourth sub-pixel including a fourth color filter that transmits light having a spectrum peak falling on a spectrum of blue, wherein
each of a size of the third color filter and a size of the fourth color filter is greater than a size of the first color filter and a size of the second color filter, and
a combined size of the size of the first color filter and the size of the second color filter is greater than the size of the third color filter.

2. The display device according to claim 1, wherein the combined size of the size of the first color filter and the size of the second color filter is equal to or greater than the size of the fourth color filter.

3. The display device according to claim 1, wherein the size of the fourth color filter is greater than the size of the third color filter.

4. The display device according to claim 1, wherein the first sub-pixel, the second sub-pixel, the third sub-pixel, and the fourth sub-pixel each include a reflective electrode that reflects light transmitted through the corresponding color filter.

5. The display device according to claim 4, wherein the first sub-pixel, the second sub-pixel, and the third sub-pixel in combination reproduce yellow.

6. The display device according to claim 4, wherein the first sub-pixel and the second sub-pixel in combination reproduce green.

7. A display device comprising:
a plurality of pixels each consisting of four sub-pixels, the four sub-pixels including:
a first sub-pixel including a first color filter that transmits light having a spectrum peak falling on a spectrum of reddish green;
a second sub-pixel including a second color filter that transmits light having a spectrum peak falling on a spectrum of bluish green;
a third sub-pixel including a third color filter that transmits light having a spectrum peak falling on a spectrum of red; and
a fourth sub-pixel including a fourth color filter that transmits light having a spectrum peak falling on a spectrum of blue, wherein
each of a size of the third color filter and a size of the fourth color filter is greater than a size of the first color filter and a size of the second color filter,
a combined size of the size of the first color filter and the size of the second color filter is equal to or greater than the size of the third color filter, and
a side of the first color filter in the first sub-pixel is directly adjacent to a side of the second color filter in the second sub-pixel.

8. The display device according to claim 4, wherein
the first sub-pixel, the second sub-pixel, the third sub-pixel, and the fourth sub-pixel are each divided into a plurality of sub-divided pixels having different areas, and
N-bit gradation expression is performed through a combination of whether each of the sub-divided pixels transmits light, where N is a natural number of 2 or greater.

9. The display device according to claim 8, wherein each of the sub-divided pixels comprises:
a first substrate provided with the reflective electrodes;
a second substrate provided with the color filters and a translucent electrode; and
a liquid crystal layer disposed between the reflective electrode and the translucent electrode, wherein each of the sub-divided pixels included in the sub-pixels has a holder that holds a potential variable according to the gradation expression.

10. A color filter substrate for a display device comprising:
a plurality of pixel areas each including four sub-pixel areas, the four sub-pixel areas including:

a first sub-pixel area in which a first color filter is disposed, the first color filter transmitting light having a spectrum peak falling on a spectrum of reddish green;

a second sub-pixel area in which a second color filter is disposed, the second color filter transmitting light having a spectrum peak falling on a spectrum of bluish green;

a third sub-pixel area in which a third color filter is disposed, the third color filter transmitting light having a spectrum peak falling on a spectrum of red; and a fourth sub-pixel area in which a fourth color filter is disposed, the fourth color filter transmitting light having a spectrum peak falling on a spectrum of blue, wherein, in a plan view, the first color filter is in contact with the second color filter, each of the third sub-pixel area and the fourth sub-pixel area is greater in size than the first sub-pixel area and the second sub-pixel area, and a combined area of the first sub-pixel area and the second sub-pixel area is equal to or greater than the third sub-pixel area.

11. The color filter substrate for a display device according to claim 10, wherein the combined area of the first sub-pixel area and the second sub-pixel area is equal to or greater than the fourth sub-pixel area.

12. The color filter substrate for a display device according to claim 10, wherein the fourth sub-pixel area is greater than the third sub-pixel area.

13. The display device according to claim 1, wherein all of the first color filter, the second color filter, the third color filter, and the fourth color filter respectively have a shape of a rectangular.

14. The display device according to claim 1, wherein, in each of the pixels, one of vertexes of the first sub-pixel filter and one of vertexes of the second sub-pixel filter are directly adjacent to each other and are directly adjacent to a side of the fourth sub-pixel filter.

15. The display device according to claim 1, wherein, in each of the pixels, one of vertexes of the third sub-pixel filter and one of vertexes of the fourth sub-pixel filter are directly adjacent to each other and are directly adjacent to a side of the first sub-pixel filter.

* * * * *